United States Patent [19]
van der Lely et al.

[11] 4,015,411
[45] * Apr. 5, 1977

[54] RAKING MACHINES

[76] Inventors: Cornelis van der Lely, 7, Bruschenrain, Zug, Switzerland; Ary van der Lely, 10, Weverskade, Maasland, Netherlands

[ * ] Notice: The portion of the term of this patent subsequent to June 15, 1993, has been disclaimed.

[22] Filed: Oct. 11, 1974

[21] Appl. No.: 514,309

[30] Foreign Application Priority Data

| Oct. 12, 1973 | Netherlands | 7314028 |
| Feb. 18, 1974 | Netherlands | 7402172 |
| Jan. 18, 1974 | Netherlands | 7400685 |
| June 19, 1974 | Netherlands | 7408181 |

[52] U.S. Cl. .................................. 56/366; 56/400
[51] Int. Cl.² ........................................ A01D 79/00
[58] Field of Search ............ 56/365, 366, 370, 377, 56/400

[56] References Cited
UNITED STATES PATENTS

| 3,527,040 | 9/1970 | Teagle | 56/370 |
| 3,896,613 | 7/1975 | van der Lely | 56/370 |

FOREIGN PATENTS OR APPLICATIONS 1,165,923   3/1964   Germany .............................. 56/370

*Primary Examiner*—Russell R. Kinsey
*Attorney, Agent, or Firm*—Mason, Mason & Albright

[57] ABSTRACT

A raking machine has preferably two rake heads that are rotatable about upwardly extending axes. Each rake head has an outer circumference defined by a generally circular flexible wall with raking means supported on the circumference of the wall. The wall can have stiffening members to reinforce the wall and to hold tines or tine groups that can be pivotally mounted adjacent the lower portion of the wall. Also, the wall can be supported from a central hub by flexible spokes or chains. Alternatively, the wall can be foldable to an accordian configuration and hold crop within the folds which are controlled by a link chain and track with a driven sprocket member. The flexible wall is controlled to deposit crop at the desired place during rotation of the head or heads and crop guide members can be positioned with respect to the head or heads to arrange the crop in swaths.

47 Claims, 34 Drawing Figures

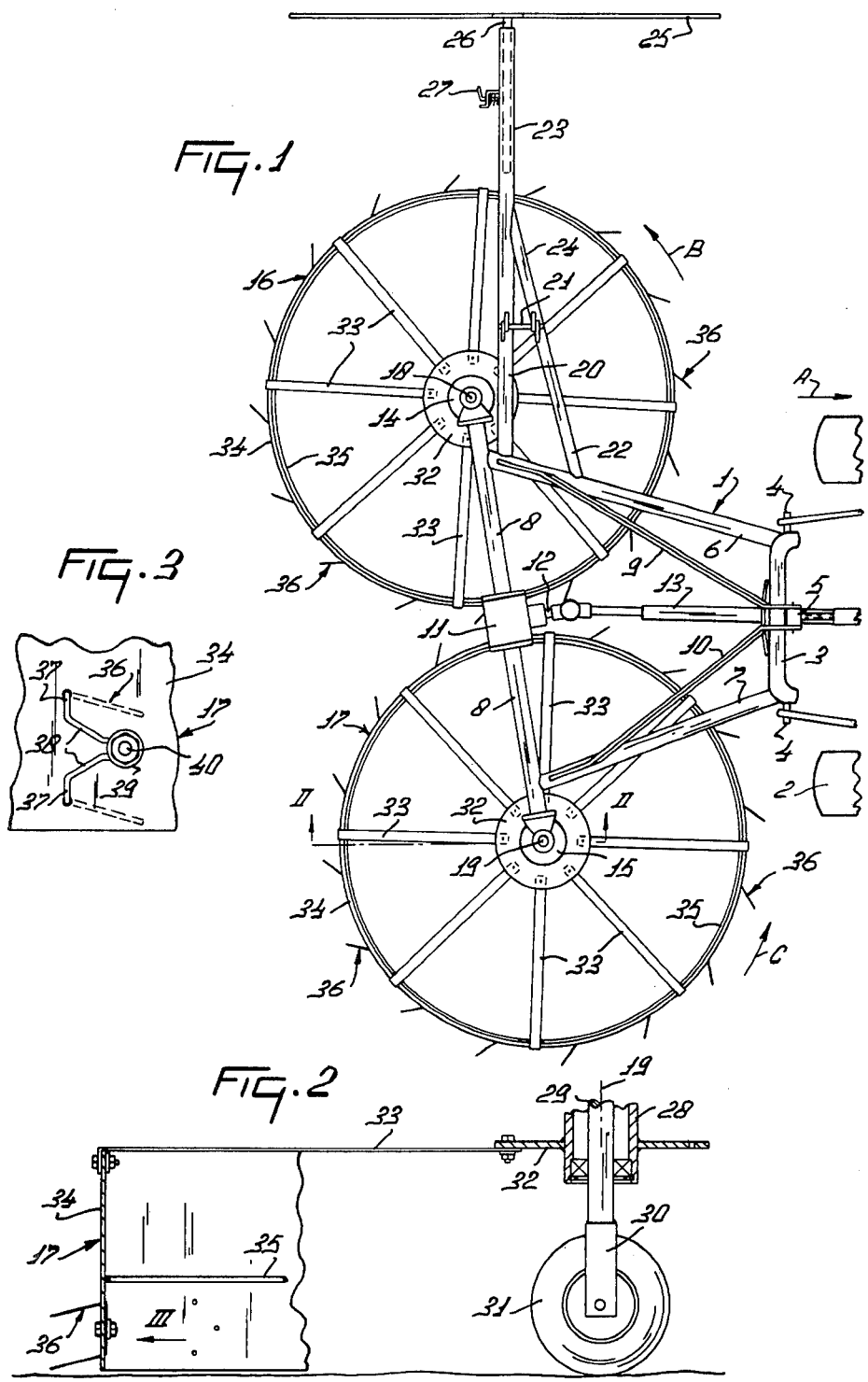

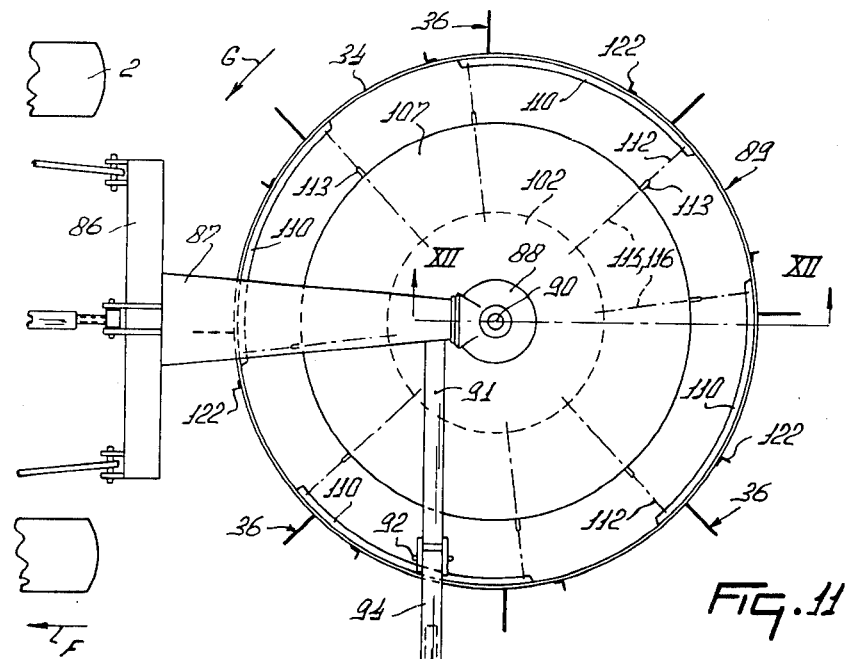
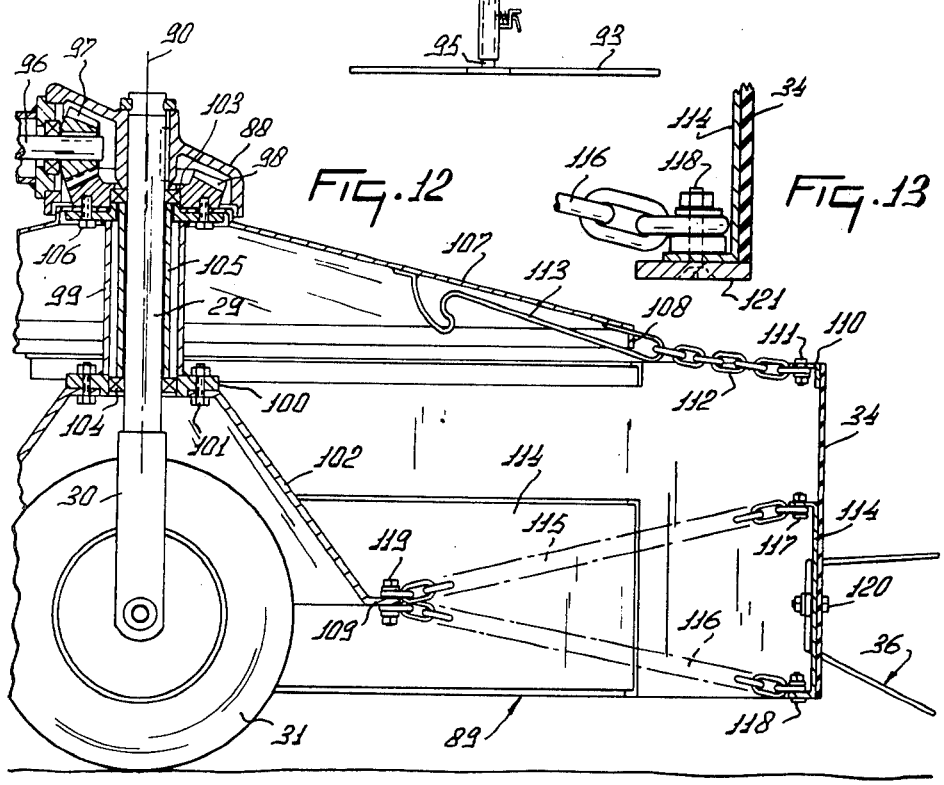

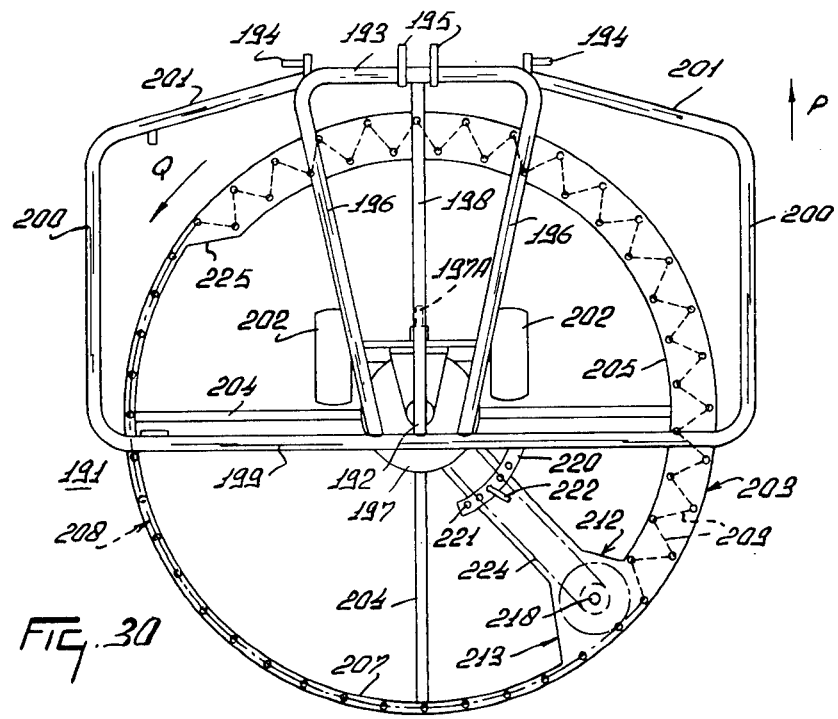
FIG. 30
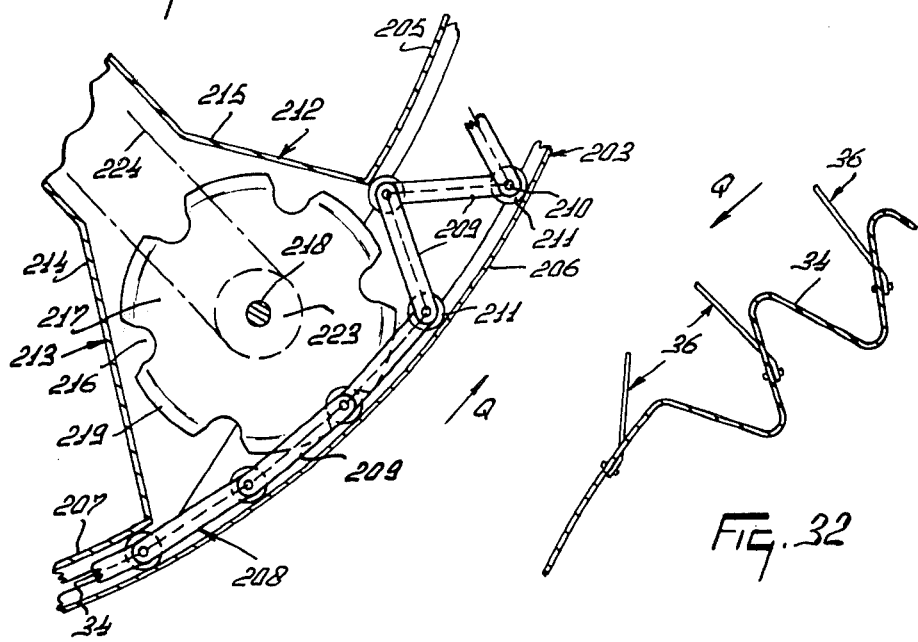
FIG. 31
FIG. 32

RAKING MACHINES

According to the invention, there is provided a machine of the kind set forth, wherein the rake member comprises at least one raking element which is, at least during working, arranged around the axis of rotation and which at least partly comprises flexible sheet material.

Figure 6:
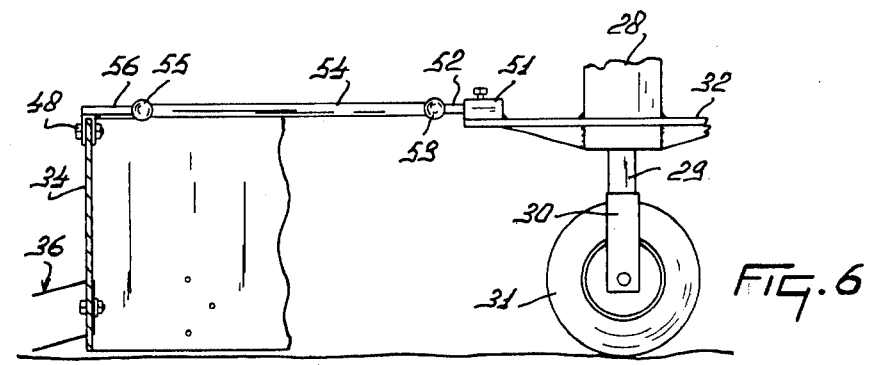
Figure 7:
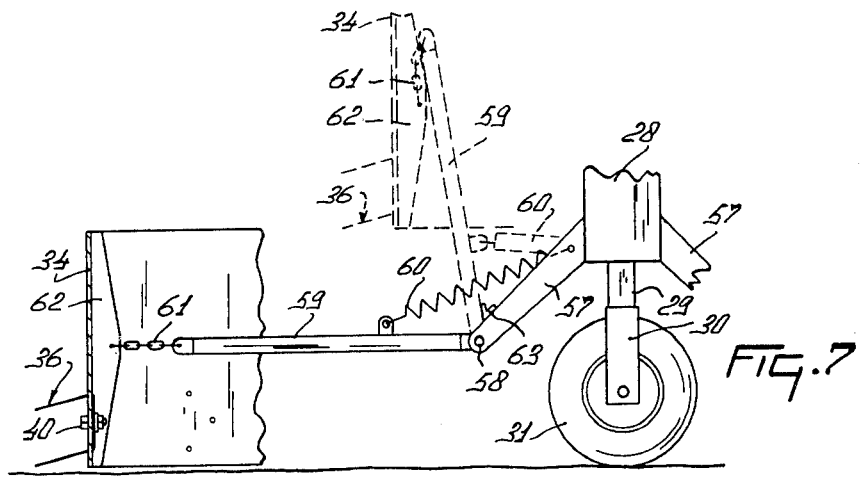
Figure 9:
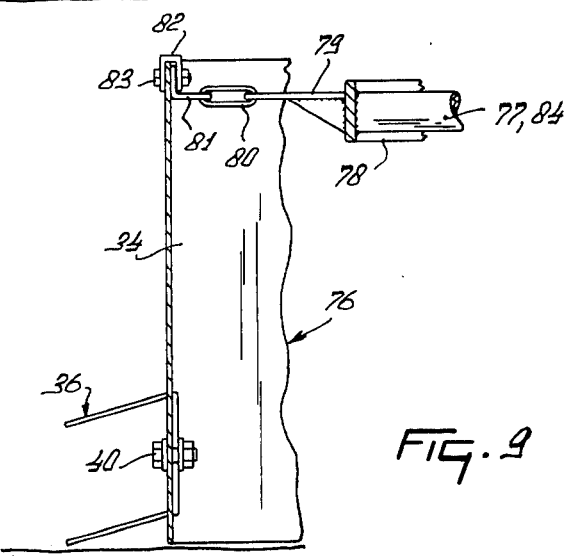
Figure 10:
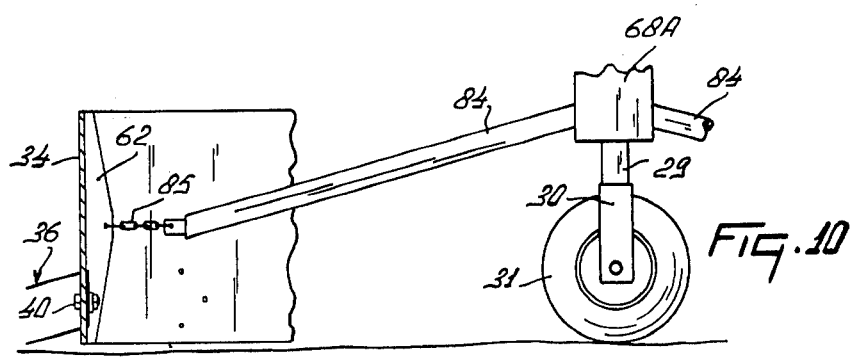
Figure 8:
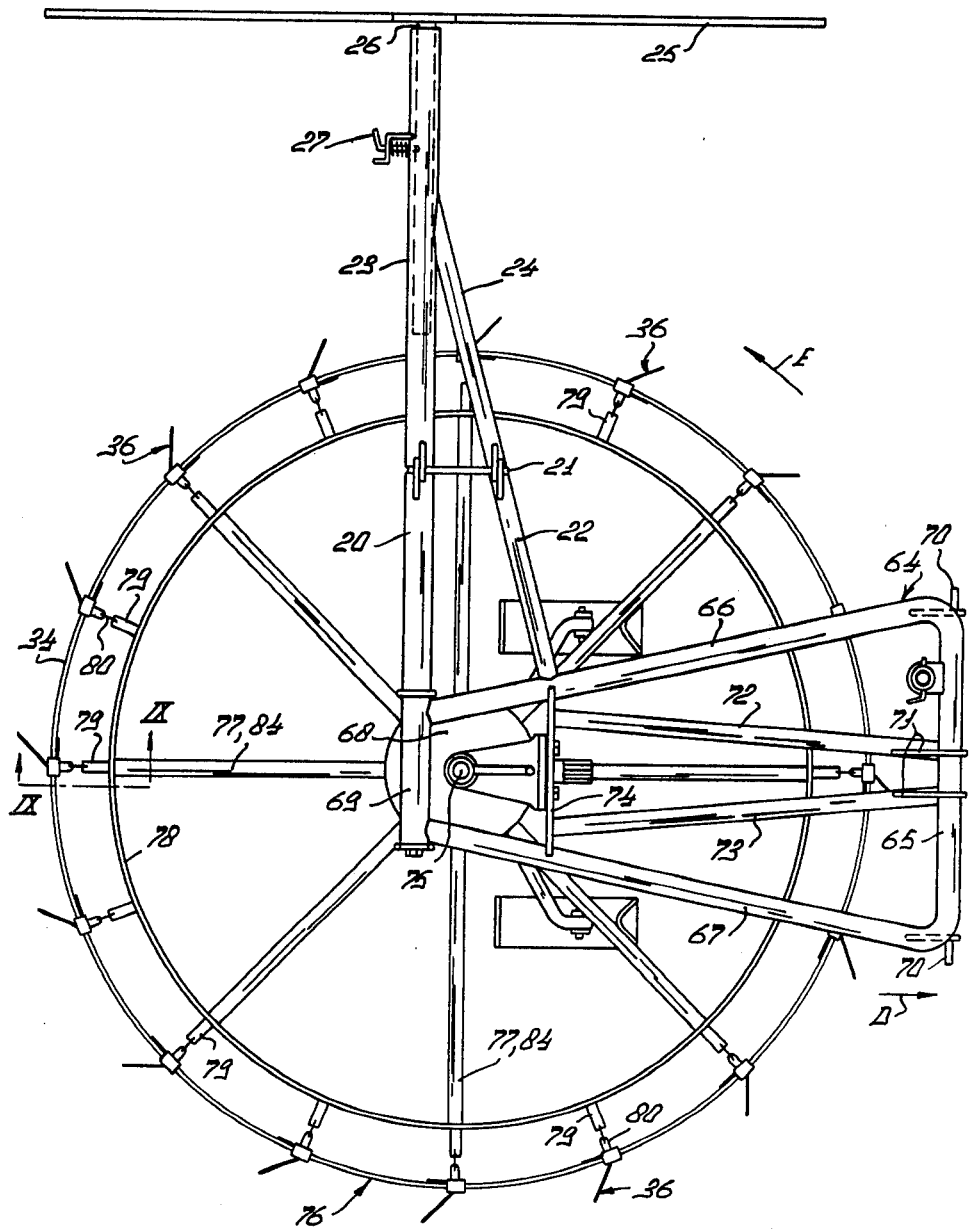
Figure 14:
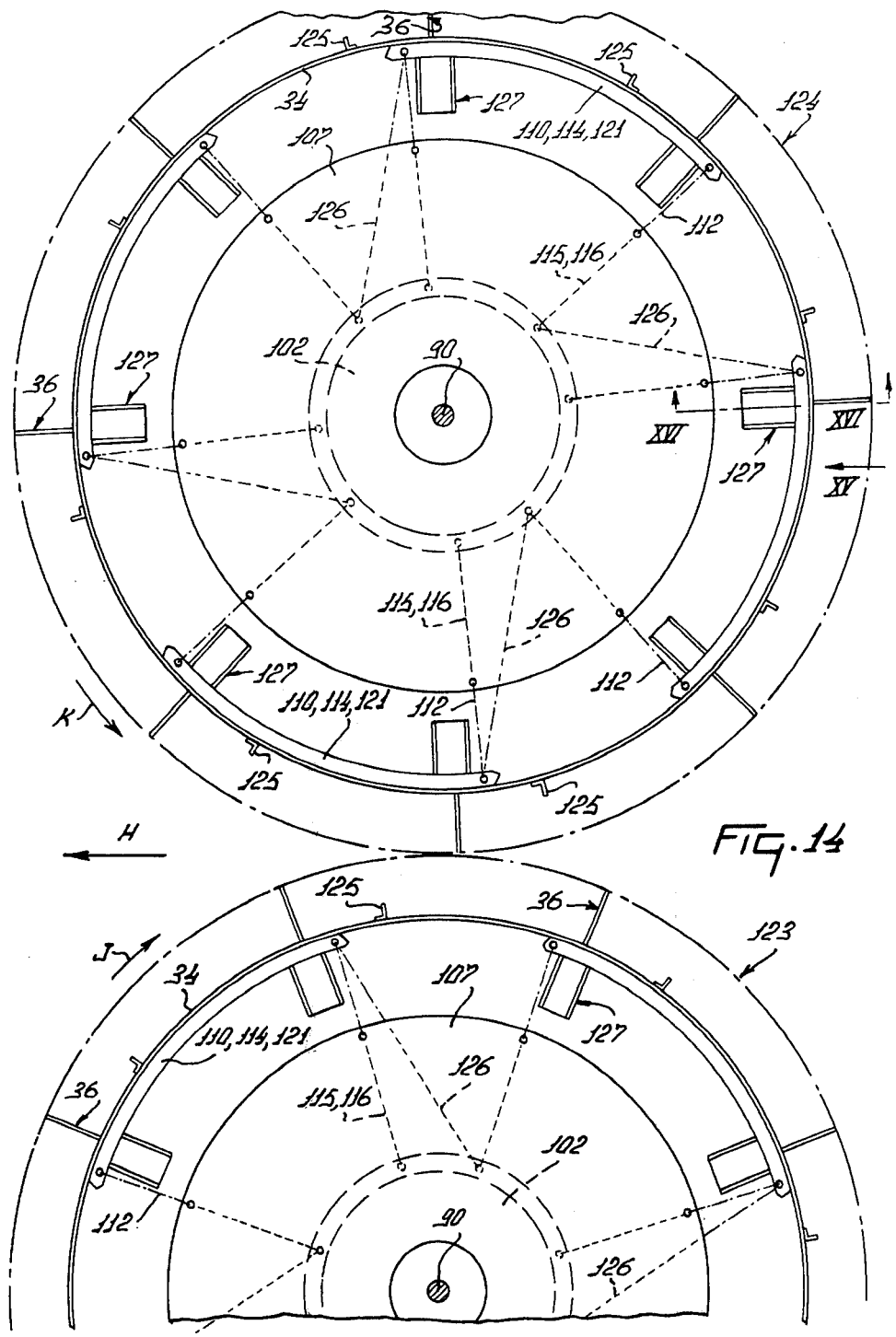
Figure 15:
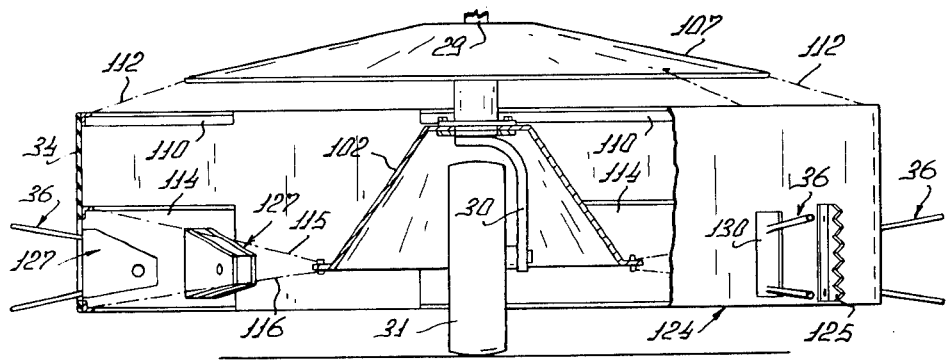
Figure 16:
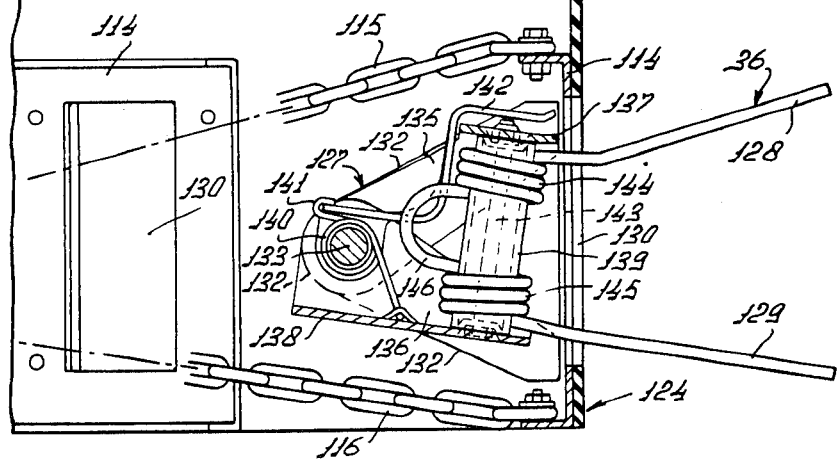
Figure 17:
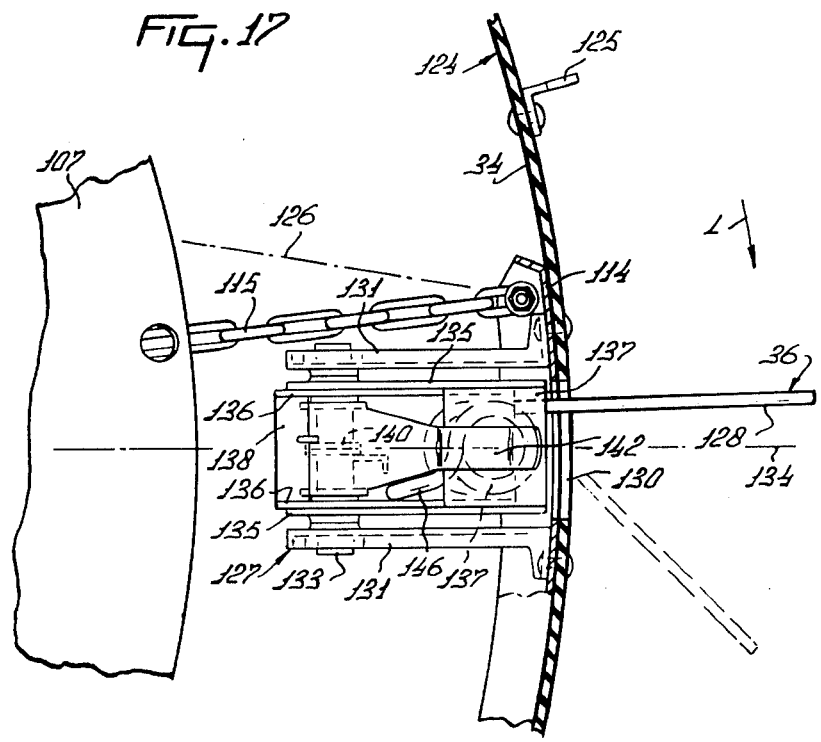
Figure 18:
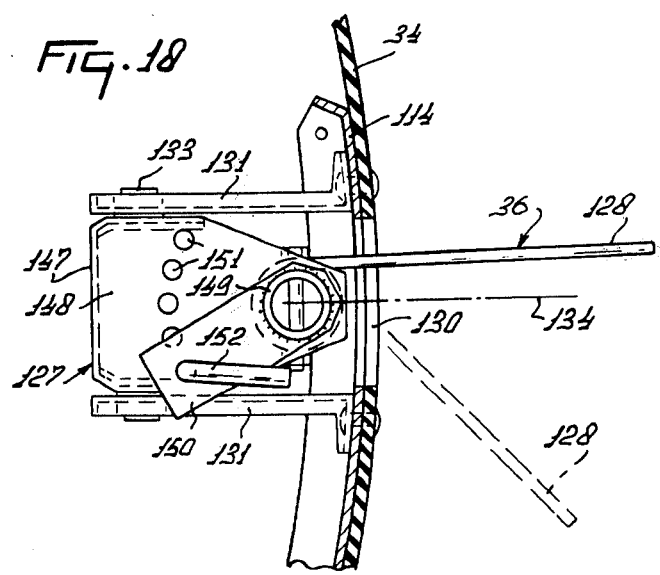
Figure 20:
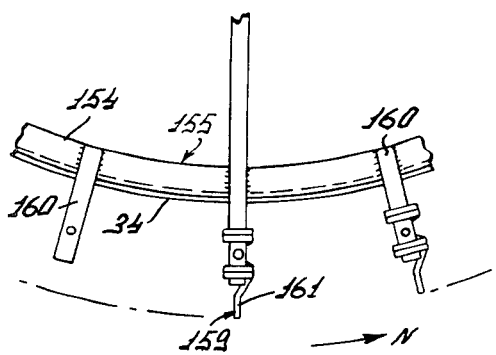
Figure 21:
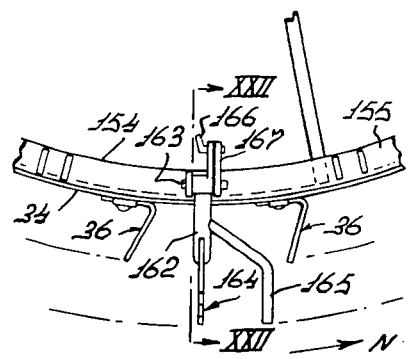
Figure 22:
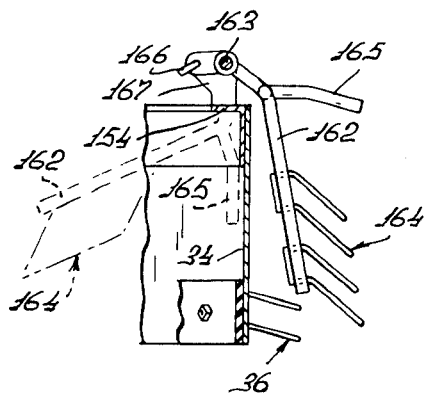
Figure 19:
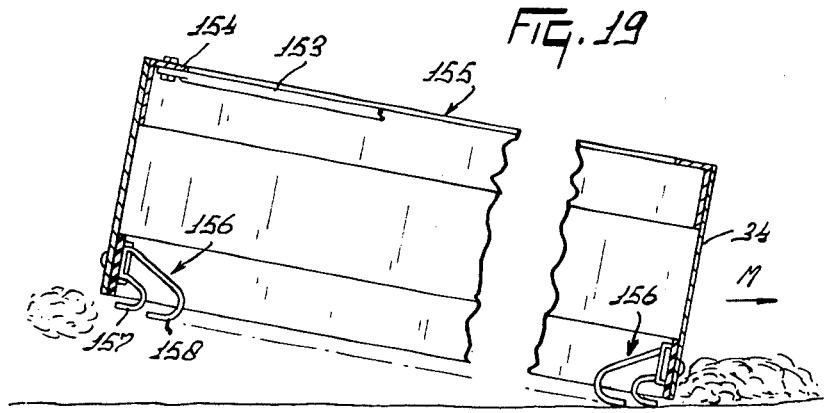
Figure 23:
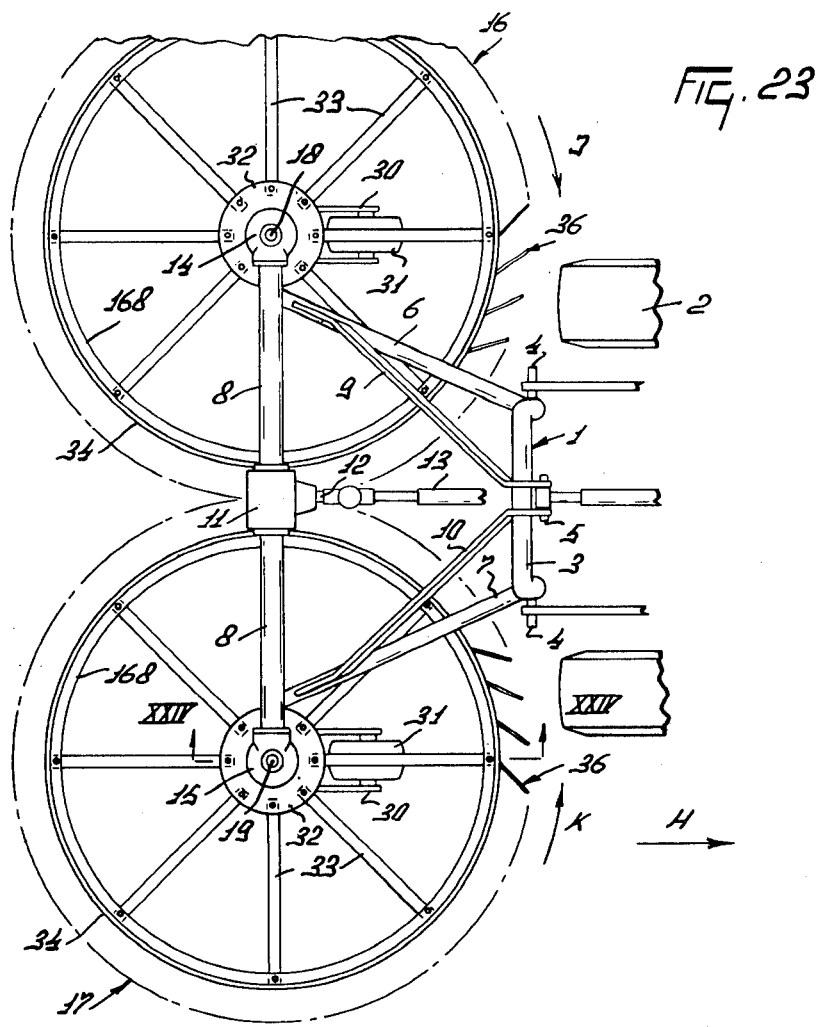
Figure 24:
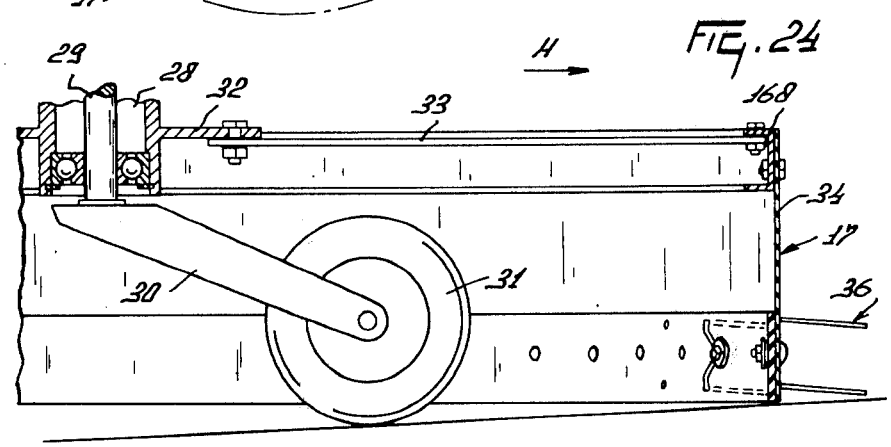
Figure 25:
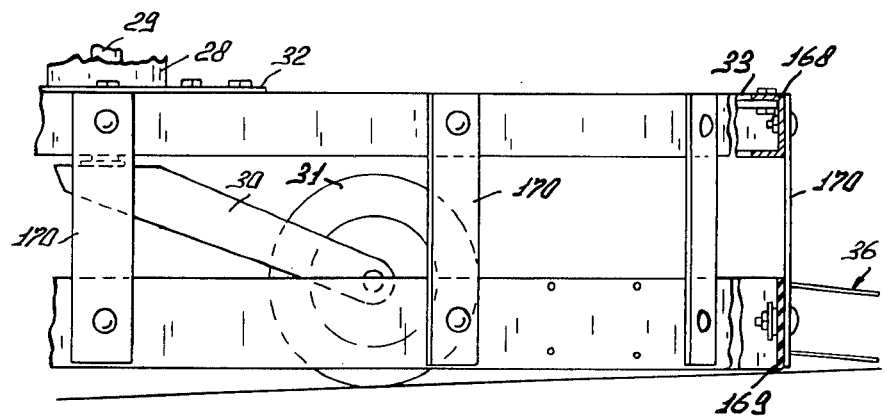
Figure 26:
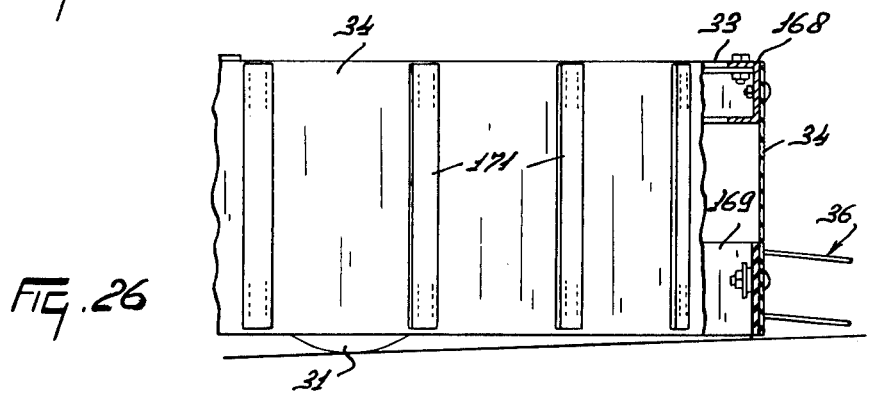
Figure 27:
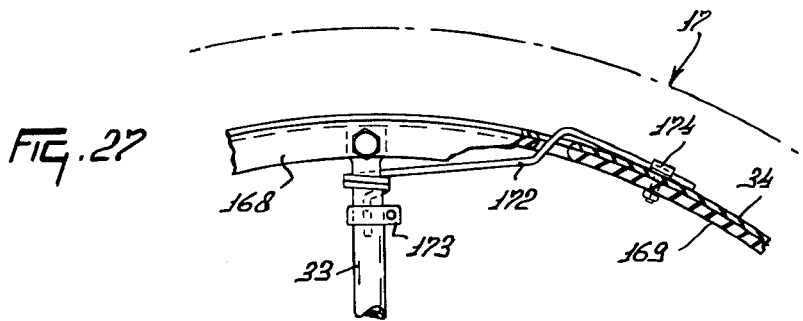
Figure 28:
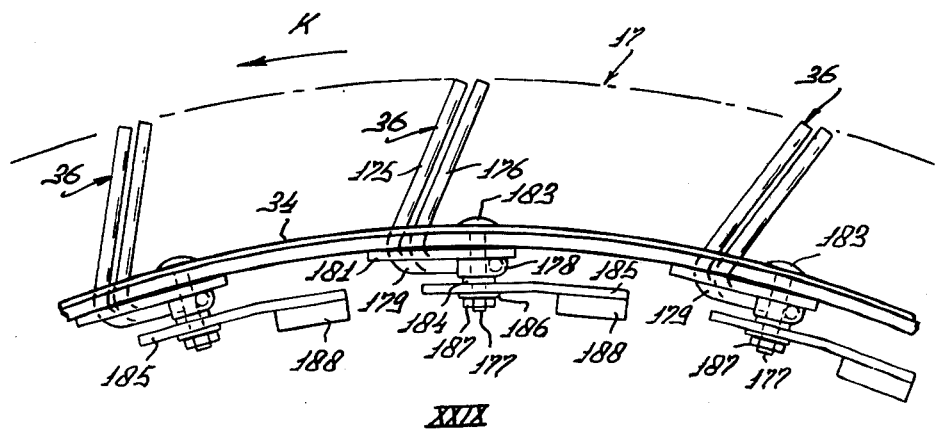
Figure 29:
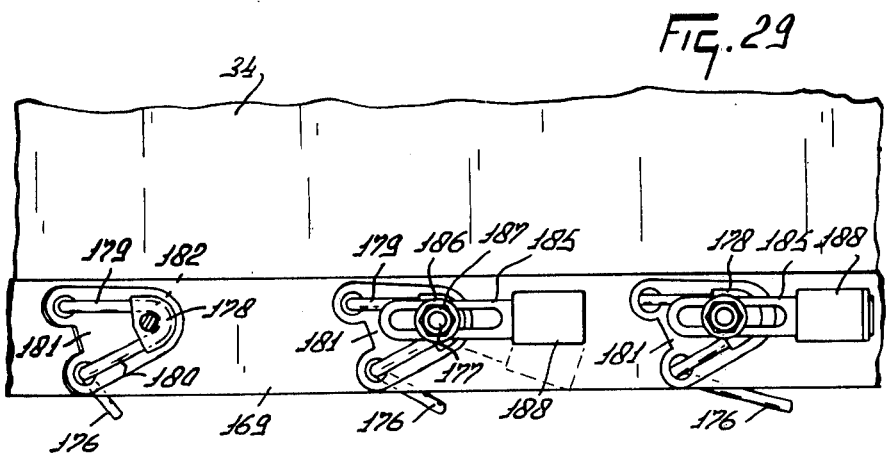
Figure 33:
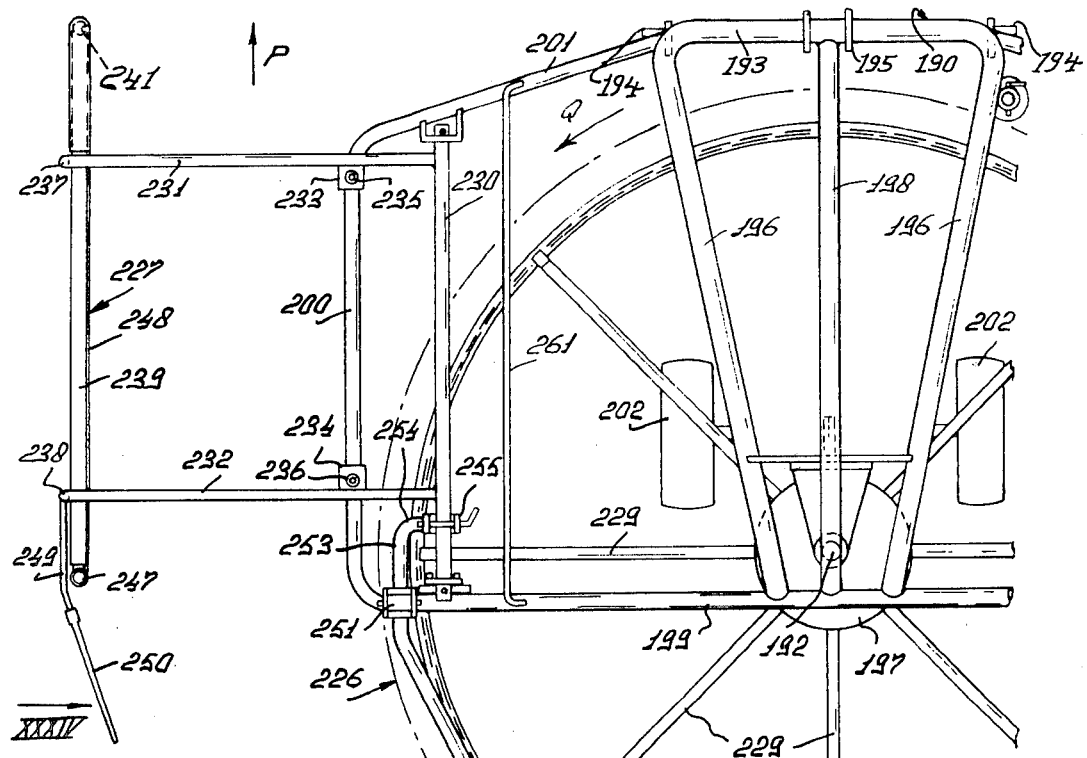
Figure 34:
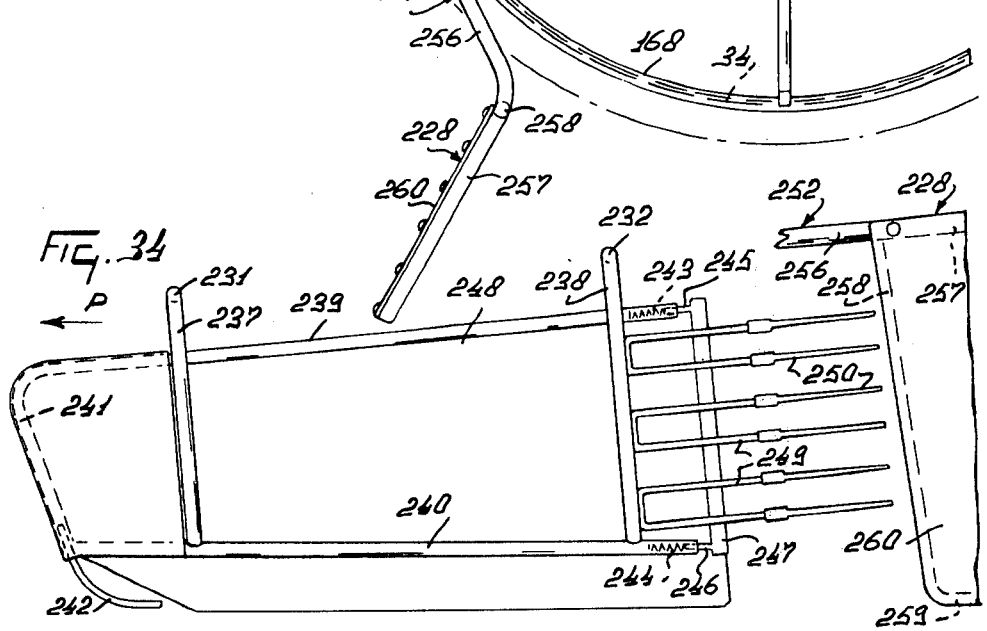

For a better understanding of the invention, and to show how the same may be carried into effect, reference will now be made, by way of example, to the accompanying drawings, in which:

FIG. 1 is a plan view of a raking machine in accordance with the invention connected to the rear of an agricultural tractor, FIG. 2 is a section, to an enlarged scale, taken on the line II-II in FIG. 1, FIG. 3 is a fragmentary elevation view, to an enlarged scale, as seen in the direction indicated by an arrow III in FIG. 2, FIGS. 4, 5, 6 and 7 are all views similar to that of FIG. 2, but illustrate four alternative constructions, FIG. 8 is a plan view of a further raking machine in accordance with the invention, FIG. 9 is a fragmentary section view, to an enlarged scale, taken on the line IX-IX in FIG. 8, FIG. 10 is a section view taken in the plane of the line IX—IX in FIG. 8 but is of greater sectional extent than FIG. 9, is to a reduced scale as compared with that Figure, and illustrates an alternative embodiment of parts of the machine of FIG. 8, FIG. 11 is a plan view illustrating a further raking machine in accordance with the invention connected to the rear of an agricultural tractor, FIG. 12 is a section view in part, to an enlarged scale, taken on the line XII—XII in FIG. 11, FIG. 13 is a fragmentary sectional view, to an enlarged scale, illustrating an alternative construction of parts that can be seen in FIG. 12, FIG. 14 is a diagrammatic plan view illustrating the arrangement of two rake members in a raking machine in accordance with the invention, other parts of the machine being omitted, FIg. 15 is a rear elevation of one of the rake members shown in FIG. 14 as seen in the direction indicated by an arrow XV in that Figure, FIG. 16 is a section view in part, to an enlarged scale, taken on the line XVI—XVI in FIG. 14, FIG. 17 is a view as seen in the direction indicated by an arrow XVII in FIG. 16, FIG. 18 is a plan view as seen in the direction indicated by the arrow XVII in FIG. 16 but illustrates an alternative construction FIG. 19 is a vertical section view illustrating the operation of an alternative form of rake member of a machine in accordance with the invention, FIGS. 20 and 21 are plan views of parts of the circumferences of further forms of rake members of machines in accordance with the invention, FIG. 22 is a section view taken on the line XXII-—XXII in FIG. 21, FIG. 23 is a plan view of a further raking machine in accordance with the invention connected to the rear of an agricultural tractor, FIG. 24 is an elevation view in section taken on the line XXIV—XXIV in FIG. 23, FIG. 25 is an elevation view in section also taken on the line XXIV—XXIV in FIG. 23 but illustrating an alternative embodiment, FIG. 26 is an elevation view in section taken on the line XXIV—XXIV in FIG. 23 showing a still further embodiment, FIG. 27 is a plan view in part illustrating a further rake member of a machine in accordance with the invention, FIG. 28 is a plan view in part of the circumference of a further rake member of a machine in accordance with the invention, FIG. 29 is a side elevation view in part as seen in the direction indicated by an arrow XXIX in FIG. 28, FIG. 30 is a plan view of a further form of raking machine in accordance with the invention, FIG. 31 is a plan view in part, to an enlarged scale, illustrating further details of a circumferential region of the rake member of the machine of FIG. 30, FIG. 32 is a fragmentary sectional view, to an enlarged scale, illustrating details of a further circumferential region of the rake member of the machine in FIG. 30, FIg. 33 is a plan view of part of a further form of machine in accordance with the invention which includes crop guiding means, and FIG. 34 is a side elevation in part as seen in the direction indicated by an arrow XXXIV in FIG. 33.

Referring to FIGS. 1 to 3 of the drawings, the raking or haymaking machine or implement that is illustrated has a frame that is generally indicated by the reference 1, said frame being arranged for connection to the three-point lifting device or hitch of an agricultural tractor 2 or other operating vehicle through the intermediary of a coupling member or trestle 3 formed from tubular beams to produce a generally inverted U-shaped configuration. The lower ends of the coupling member or trestle 3 have fastening means 4 in the form of substantially horizontally aligned pins for pivotal connection to the lower lifting links of the three-point lifting device or hitch of the tractor 2 or other vehicle while the apex of said trestle or coupling member 3 is provided with further fastening means 5 in the form of vertically disposed plates arranged for establishing a pivotal connection with the upper lifting link of the three-point lifting device or hitch that has just been mentioned, that upper lifting link usually being of adjustable length as illustrated in FIG. 1. Two tubular beams 6 and 7 diverge rearwardly with respect to the intended direction of operative travel of the machine which is indicated by an arrow A in FIG. 1 of the drawings from locations close to the fastening means 4, said beams 6 and 7 also being upwardly inclined in a rearward direction from their leading ends. The beam 6 is of greater length than the beam 7 and the rearmost ends of both beams are rigidly secured to a substantially horizontally disposed tubular beam 8. As will be evident from FIG. 1 of the drawings, the longitudinal axis of the beam 8 is non-perpendicularly inclined to the direction A as a result of the dissimilarity in length of the beams 6 and 7, the arrangement being such that the junction between the beams 7 and 8 is further advanced with respect to the direction A than is the junction between the beams 6 and 8. Two supporting strips 9 and 10 have their leading ends with respect to the direction A secured to the top of the coupling member or trestle 3 adjacent the fastening means 5, said strips 9 and 10 diverging rearwardly from their leading ends and having their rearmost ends welded or otherwise rigidly secured to the tops of the beams 6 and 7 near the junctions thereof with the beam 8. When the machine is in an operative position, the strips 9 and 10 are horizontally or substantially horizontally disposed.

A gear box 11 is arranged in the beam 8 approximately midway along the length of the latter, said gear box being provided with a splined or otherwise keyed rotary input shaft 12 that projects generally forwardly therefrom with respect to the direction A. The input shaft 12 can be placed in driven connection with the power take-off shaft of the tractor 2 or other operating vehicle by way of an intermediate telescopic transmission shaft 13, of a construction which is known per se, having universal joints at its opposite ends. The gear box 11 also has two substantially horizontally aligned output shafts which extend therefrom axially into the interiors of the two halves of the hollow beam 8. Bevel pinions or other rotary transmission members located inside the gear box 11 place the input shaft 12 thereof in driving connection with the output shafts that have just been mentioned. The output shafts of the gear box 11 are connected to two driving shafts or can be integral with those driving shafts, the ends of said driving shafts that are remote from the gear box 11 being entered in gear means 14 and 15 which are rigidly secured to the free ends of the beam 8. Bevel pinions or other transmission within the gear means 14 and 15 enable two corresponding rake members or rake heads 16 and 17 to be rotated around corresponding substantially vertical, or at least upright, axes 18 and 19. The two axes 18 and 19 are parallel to one another and, in the embodiment illustrated in FIGS. 1 to 3 of the drawings, they are truly vertically disposed or are inclined to the vertical to only an insignificant extent. However, as an alternative, they may both be inclined to the strictly vertical in such a way that an upper point on each axis is located further forwardly with respect to the direction A than is a lower point thereon.

The drive transmission from the input shaft 12 to the two rake members 16 and 17 is constructed and arranged in such a way that, upon applying rotary drive to said shaft 12, both rake members will rotate in the same directions that are indicated by arrows B and C in FIG. 1. A substantially horizontal supporting beam 20 has one end welded to the tubular beam 6 close to the rearmost end of that beam in such a way that said beam 20 extends substantially horizontally perpendicular to the direction A. A further tubular beam 22 has one end secured to the tubular beam 6 and is substantially horizontally disposed in such a way that the two beams 20 and 22 are in convergent relationship in a direction away from the beam 6. Free end regions of the beams 20 and 22 carry lugs in which a pivot 21 is supported so as to extend substantially horizontally parallel to the direction A. A tubular extension arm 23 and a tubular beam 24 which makes an inclined junction therewith both carry lugs that also engage the pivot 21 and, when the machine is in an operative position as illustrated in FIG. 1 of the drawings, the extension arm 23 is in substantially rectilinear alignment with the beam 20 and the beam 24 is in substantially rectilinear alignment with the beam 22. The arm 23 and beam 24 cannot turn downwardly beyond this position of substantial alignment about the axis of the pivot 21 because of abutment between the ends of the aligned beams but upward turning movement thereof about the axis of the pivot 21 is freely possible against the action of gravity alone. An adjustable or setting tube 26 is slidable telescopically into and out of the free end of the extension arm 23, the projecting end of said setting tube 26 being rigidly connected to a substantially vertical swath board 25 whose general plane is substantially parallel to the direction A. The extension arm 23 carries a locking pin 27 or other setting member, the tip of the locking pin being urged through the wall of the tubular arm 23 and into any chosen one of a number of holes that are spaced apart from one another along the length of the setting tube 26. The hole that is chosen for co-operation with the locking pin 27 governs the distance of the swath board 25 from the nearest rake member 16. It is preferred that the holes in the setting tube 26 should co-operate with the tip of the locking pin 27 with some clearance so that the swath board 25 will be turnable about the axis of the extension arm 23 to a limited extent to assist it in matching undulations in the surface of the ground that may be met with during the operation of the machine. All of the parts 23, 24, 25, 26 and 27 can be turned upwardly through substantially 180° about the axis of the pivot 21 to bring those parts to a position in which the swath board 25 lies on top of the frame 1 in an inoperative condition.

The rake members 16 and 17 of the machine of FIG. 1, which rake members are substantially identical in construction, will now be further described with particular reference to FIGS. 2 and 3 of the drawings which illustrate the rake member 17. The rake member 17 has a central sleeve-like hub 28 which is mechanically rotatable about the axis 19 from the driven transmission which includes the gear means 15. The hollow sleeve-like hub 28 is rotatably arranged around a thick rod or shaft 29 with the aid of suitably arranged ball bearings one of which can be seen in FIG. 2 of the drawings. The rod or shaft 29 is rigidly secured with respect to gear means 15 during operation of the machine and its vertical or substantially vertical longitudinal axis is coincident with the axis of rotation 19 of the rake member 17. A ground wheel 31 is rotatably mounted beneath the lowermost end of the rod or shaft 29, internally of the rake member 17, with the aid of a forked wheel carrier 30 which receives the axle of the ground wheel 31 between its limbs. An annular flange 32 is welded or otherwise rigidly secured to the external surface of the hub 28 at a location a short distance above the lowermost end thereof in such a way that the plane of said flange 32 is perpendicular to the axis 19, the flange 32 having a circular outer circumference whose center of curvature is substantially coincident with the axis 19. A plurality of spoke-like supports 33 have their inner ends bolted or otherwise releasably secured to a peripheral region of the flange 32 at regular intervals therearound. There are eight of the spoke-like supports 33 arranged at regular intervals around the axis 19 (and similarly around the axis 18) in the example illustrated in FIGS. 1 to 3 of the drawings but it is emphasised that other numbers of the supports 33, such, for example, as ten, could equally well be provided. Each support 33 is strictly radially disposed in the example illustrated in the Figures that have just been mentioned but this, also, is by no means essential and constructions may be employed in which each support 33 trails, or is swept back, to some extent with respect to a truly radial line that intersects its innermost end and with respect to the direction of rotation C (or B). In the embodiment which is being described, each support 33 is formed from spring steel strip or other resilient material and is so shaped and constructed that it will behave flexibly when subject to forces that act upon the rake member 17 during the use of the machine, such forces being discussed below. The length of each support 33 is preferably substantially 80% of the radius of the rake member 17 and should have a length which is not less than 50% of that radius.

The ends of the supports 33 that are remote from the hub 28 hold a continuous flexible wall 34 which may be formed as a single unit or as a number of interconnected portions that present no appreciable discontinuities in the surface of the wall. The outer ends of the supports 33 are bolted or otherwise releasably secured to an upper edge region of the wall 34. In an alternative embodiment, the spring steel strips or the like which afford the supports 33 are replaced by rigid tubular supports whose radially inner ends are rigidly secured to the hub 28. As can be seen in FIGS. 1 and 2 of the drawings, the wall 34 is of substantially rightcircular cylindrical configuration, the upright longitudinal axis of the cylinder substantially coinciding with the axis 19. The height of the wall 34 in a direction parallel to the axis 19 is preferably not less than substantially 15% of the diameter of the rake member 17 and preferably not more than substantially 25% of that diameter. A wall height of substantially 40 centimeters has been found to be preferable for most purposes.

The wall 34 is made from a flexible material which is preferably cloth, sheet rubber or sheet synthetic plastics material reinforced, if considered necessary, by flexible wires, strips or the like. A quite light material such a canvas may be used provided only that the nature of the material is such that a region thereof that is subject to the application of a force during operation of the machine can deflect substantially radially inwardly or outwardly and/or upwardly or downwardly in a direction more or less parallel to the axis 19 relative to neighbouring more or less unaffected regions of the material of the wall 34. As will be evident from FIG. 2 of the drawings, the lowermost edge of the wall 34 is located in close proximity to the ground surface during the operation of the machine. The upper edge of the wall 34 can be secured to the free ends of the spoke-like supports 33 in a simple manner by bending the outermost end of each such support 33 downwardly through an angle of 90° and forming it with an eye. Small bolts can then be entered through the eyes and through registering holes in the upper edge region of the wall 34 as illustrated in FIG. 2 of the drawings. As will be seen in that Figure, a washer or the like is preferably provided at the side of the material of the wall 34 that is opposite to the side bearing against the boundary of the eye in the bent-over end of each support 33 so that, when each bolt is tightened, the material of the wall 34 is clamped between two flat metal surfaces. It is preferred, but is not essential, that a stiffening member 35 should be provided to ensure that the wall 34 is not too flexible. The stiffening member 35 (FIG. 2) is of circular configuration and is contained in a plane that is substantially perpendicular to the axis 19, the center of curvature of the member 35 being substantially coincident with that axis. The member 35 is located at a horizontal level above the lowermost edge of the wall 34 that is not less than substantially 25% and not more than substantially 50% of the distance between the lowermost and uppermost edges of that wall. A distance above the lowermost edge of the wall 34 of substantially 40% of the distance between said lowermost and uppermost edges is, in fact, preferred. The stiffening member 35 is preferably formed from spring steel strip having substantially the same degree of flexibility as the strip from which the supports 33 are made in the embodiment illustrated in FIGS. 1 to 3 of the drawings. With this preferred construction of the member 35, the strip from which it is formed is arranged in such a way that the longer sides of its oblong cross-section are parallel to the axis 19.

A lower region of the wall 34 is provided, around the whole of its circumference, with a large number of tines arranged in groups 36. In the embodiment illustrated in FIGS. 1 to 3 of the drawings, there are 32 of the tines arranged in 16 groups each of which comprises two tines, the groups being angularly spaced apart from one another on the wall 34, around the axis 19, at 22½° intervals. The two tines in each group 36 are contained in a corresponding vertical or substantially vertical plane. Each tine has a length which is not less than substantially 10% and not more than substantially 15% of the radius of the wall 34, a magnitude of substantially 12.5% of that radius being preferred. As can be seen in FIG. 1 of the drawings, the tines of each group 36 are arranged in swept back or rearwardly trailing positions with respect to the intended directions of rotation B and C of the rake members 16 and 17. As seen in FIG. 1 of the drawings, each tine preferably has an angular inclination of substantially 45° to a radial line intersecting the inner or root end of that line (i.e. the junction thereof with the material of the wall 34) but an angular inclination of any value between substantially 30° and substantially 60° could also be used. It will also be evident from FIGS. 2 and 3 of the drawings that the tines of each group 36 are inclined downwardly towards their free outermost ends or tips from the points at which they extend through the material of the wall 34 and it is preferred that the longitudinal axes of the tines should make angles of between substantially 10° and substantially 30° with the ground surface.

The two tines of each group 36 are secured in position internally of the wall 34 as can be seen best in FIG. 3 of the drawings. Considered inwardly from the points where the tines penetrate through the material of the wall 34, they are bent over towards one another to form first supporting portions 37 that extend substantially coaxially parallel to the axis 19 (or 18). The ends of the first supporting portions 37 that are remote from the outwardly projecting crop working portions of the tines are bent over rearwardly with respect to the direction C or B through angles which should not be less than substantially 100° and not be more than substantially 150° to form second tine supporting portions 38 which converge towards one another and are gently curved to match the curvature of the inner surface of the material of the wall 34. The neighbouring ends of the two second tine supporting portions 38 are integrally interconnected by an acruately curved portion which subtends very nearly 360° at its center of curvature, this portion being fixed in place relative to the wall 34 by a short bolt 40 entered through a hole in the wall and a retaining washer 39 which preferably has a lip that embraces the curved portion of the time material interconnecting the supporting portions 38. The first and second tine supporting portions 37 and 38 and the integrally interconnecting arcuately curved portion are symmetrical with respect to a plane that is perpendicular to the axis 18 or 19 and that contains the longitudinal axis of the corresponding bolt 40. The second tine supporting portions 38 are between substantially 2 and substantially 3 times the length of the first tine supporting portions 37. Since the portions 37 and 38 bear against the inner surface of the wall 34, the two tines of the group 36 are retained against vertical and horizontal displacements relative to the wall 34 as a result of the forces which act upon them and upon the wall 34 during the operation of the machine. The supporting portions 37 and 38 are located in front of the bolts 40 with respect to the intended directions of rotation B and C, the outwardly projecting soil working portions of the tines being, however, rearwardly orientated with respect to those directions from the points at which the tines of the groups 36 penetrate through the material of the wall 34.

Figure 4:
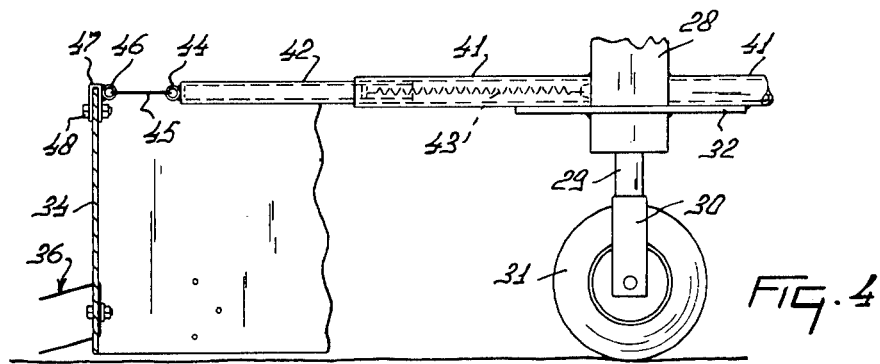

FIG. 4 of the drawings illustrates a modified form of rake member in which a plurality, such as six, of spokes 41 are rigidly secured to the top of the flange 32 by welding or the like. The spokes 41 are spaced apart from one another at regular intervals around the axis 18 or 19 and their inner ends may, if desired, also be welded or otherwise rigidly secured to the hub 28. Each spoke 41 extends radially with respect to the corresponding axis 18 or 19 with its longitudinal axis in a plane that is perpendicular to said axis 18 or 19, each spoke 41 being of rigid tubular construction. The interior of each spoke 41 is furnished with a telescopic displaceable extension arm 42 and a helical tension spring 43 is stretched, internally of the spoke 41 between the inner end of that arm 42 and an anchorage secured to the hub 28. The inner ends of the springs 41 are connected to the anchorages on the hub 28 before the spokes 41 are fastened to the flange 32 or to the flange 32 and the hub 28. Stops that are not visible in FIG. 4 of the drawings are provided to prevent the extension arms 42 from becoming axially disengaged from the corresponding spokes 41. The strength of each spring 43 is such that, when the corresponding rake member is rotationally at rest, each extension arm 42 is located almost completely inside the corresponding spoke 41. Each spoke 41 has a length which is equal to between substantially 40% and substantially 60% of the radius of the rake member of which it forms a part and each arm 42 is substantially equal in length to the corresponding spoke 41. The outer end of each arm 42 is provided with a corresponding eye 44 and a short length of steel cable 45 extends pivotally between that eye 44 and a further eye 46 that is welded to a clamping bracket 47 of inverted U-shaped configuration fastened around the upper edge of the wall 34 by a bolt 48 extending transversely between its limbs and through the material of the wall 34. The lengths of cable 45 that pivotally interconnect the eyes 44 and 46 allow the wall 34 to move upwardly and downwardly, inwardly and outwardly and also tangentially with respect to the remainder of the rake member, inward and outward movement also being allowed for by the telescopic arrangement of the arms 42 in the hollow spokes 41. The groups of tines 36 are constructed and fastened in position in exactly the same way as has already been described with reference to FIGS. 1 to 3 of the drawings.

Figure 5:
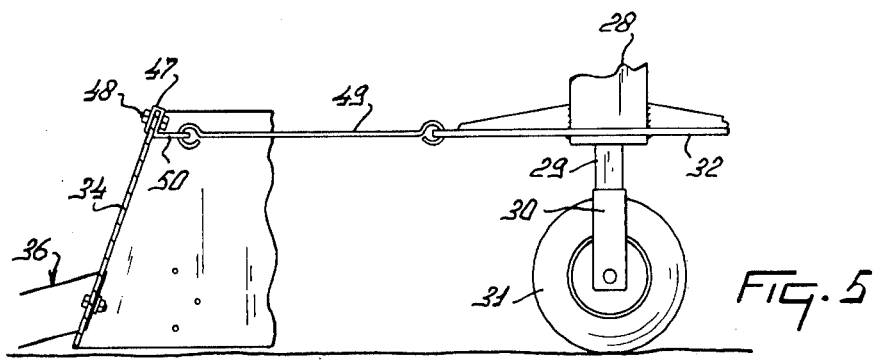

FIG. 5 of the drawings illustrates a rake member construction in which the wall 34 is of frusto conical configuration rather than right circular cylindrical configuration. The apex of the imaginary conical figure of which the wall 34 forms a part is located well above the flange 32 at a position substantially coincident with the corresponding axis 18 or 19. The conical angle at this imaginary apex is not less than substantially 20° and not more than substantially 40°. The upper edge of the wall 34 is connected to the flange 32 by a plurality of steel rods or strips 49 that are formed with eyes at their opposite ends. A circumferential region of the hub 32 is formed with a corresponding number of holes for pivotal co-operation with the eyes at the inner ends of the rods or strips 49 and the eyes at the outer ends thereof co-operate with holes in brackets 50 that extend perpendicular to the axis 18 or 19. Each bracket 50 is integral with one of the previously mentioned clamping brackets 47' which is fastened in position in the same way as has already been described with reference to FIG. 4 of the drawings. Each rod or strip 49 has a length which is equal to between substantially 40% and substantially 50% of the maximum radius of the wall 34. The pivotal connections of the rods or strips 49 to the upper edge of the wall 34 are located directly inside that upper edge and the fastening of the groups of tines 36 to the wall is substantially identical to that which has been described above except that the bends in the tine material where the tines penetrate through the material of the wall 34 are angularly modified to match the frusto conical configuration of the wall 34 as are the relative lengths of the upper and lower tines of each group.

FIG. 6 of the drawings illustrates a further rake member construction in which an outer circumferential region of the flange 32 is provided with a plurality of clamping sleeves 51. The sleeves 51 receive corresponding short rods 52 whose radially outermost ends carry ball and socket joints 53 that establish pivotal connections with the inner ends of steel rods 54. The radially outer ends of the steel rods 54 are connected by further ball and socket joints 55 to short rods 56 whose outer ends, in turn, are secured to the bases of clamping brackets that are similar to the previously described clamping brackets 47. These brackets embrace the upper edge of the wall 34 with the aid of the bolts 48. The inner and outer ball and socket joints 53 and 55 both allow universal pivotal movement between the rods 52/54 and 54/56 respectively, the outer joints 55 being located quite close to the upper edge of the wall 34. Each rod 54 has a length which is between substantially 50% and substantially 60% of the radius of the wall 34 which wall is of substantially right circular cylindrical configuration in the embodiment of FIG. 6.

FIG. 7 of the drawings illustrates a rake member embodiment in which the lower end of the hub 28 is provided with a plurality, such as four or six, of spokes 57 that are located at regular angular intervals around the corresponding axis 18 or 19 and that are all downwardly directed towards the ground surface from the hub 28 at an angle of substantially 45° to the axis 18 or 19 concerned. The lowermost and radially outermost end of each spoke 57 is provided with a corresponding pivotal shaft 58 whose axis is contained in a plane that is perpendicular to the axis of rotation 18 or 19. The axes of the shafts 58 are spaced perpendicularly from the corresponding axes 18 and 19 by distances which are between substantially 20% and substantially 30% of the operating radius of the wall 34, a distance which is equal to substantially 25% of that radius being preferred. Extension arms 59 of rigid rod or tubular formation are turnably mounted about the pivot shafts 58 and tension springs 60 are stretched between anchorages on the spokes 57 and the corresponding arms 59 to tend to turn said arms 59 upwardly about the shafts 58 into position corresponding to the position that is illustrated in FIG. 7 of the drawings in broken lines for one such arm. One end of a flexible but inextensible member in the form of a chain 61 is connected to the outer free end of each arm 59 and the opposite end of that chain 61 is connected to a corresponding stiffening strip 62 that extends substantially vertically up the inner surface of the right circular cylindrical wall 34 in substantially parallel relationship with the corresponding axis of rotation 18 or 19. The stiffening strips 62 serve to prevent excessive local deformation of the wall 34 and each of them has a substantially L-shaped cross-section with one limb fastened to the wall 34 at a plurality of vertically spaced apart points and the other limb extending substantially radially inwards towards the corresponding axis of rotation 18 or 19 for connection to the corresponding chain 61 as illustrated in FIG. 7. It will be noted that the chains 61 are connected to the stiffening strips 62 at locations approximately midway between the uppermost and lowermost edges of the wall 34.

Each spoke 57 carries a corresponding stop 63 which, as will be evident from FIG. 7, is arranged in the upward path of pivotal movement of the corresponding extension arm 59 in such a position that it will prevent that arm from turning upwardly about its pivotal shaft 58 beyond a position corresponding to the position that is illustrated in broken lines in respect of one arm 59. In this illustrated position, each arm 59 extends substantially parallel to the corresponding axis of rotation 18 or 19.

In the use of the raking machine when equipped with rake members 10 and 17 of one of the kinds that have been described with reference to FIGS. 1 to 7 of the drawings, the tractor 2 or other operating vehicle tows the machine over the field in the direction A on its two ground wheels 31. The coupling member or trestle 3 is connected to the three-point lifting device or hitch at the rear of the tractor 2 or other vehicle in the manner that has been described and the rotary input shaft 12 of the gear box 11 is in driven connection with the power take-off shaft of the same tractor 2 or other vehicle by way of the intermediate telescopic transmission shaft 13. The transmission members in the gear box 11, the tubular beam 8 and the gear boxes 14 and 15 cause the hubs 28 and the rake members 16 and 17 to revolve in the same directions B and C that are indicated by arrows in FIG. 1. The centrifugal forces that are generated by rotation of the rake members 16 and 17 act upon the walls 34 and cause them to assume their right circular cylindrical or frusto conical (FIG. 5) configurations, the walls 34 serving additionally as fellys of the two rake members 16 and 17 that carry the tine groups 36. The centrifugal forces that are generated by rotation also bring the supports 33 (FIG. 2), the rods or strips 49 (FIG. 5) and the steel rods 54 (FIG. 6) to positions in which they extend almost perpendicular to the corresponding axes of rotation 18 and 19. In the embodiment of FIG. 4 of the drawings, the centrifugal forces act upon the wall 34 and the arms 42 and cause the latter to move radially outwards against the restraining action of the springs 43. The actual position of extension of any arm 42 at any chosen instant is governed by the speed of rotation of the rake member concerned and the strength of the corresponding spring 43 which opposes the outward movement of the arm 42 that is caused by centrifugal force. A state of equilibrium between these opposing forces normally prevails during operation of the machine. The centrifugal forces that act upon the wall 34 also cause the steel cables 45 to assume positions in which their axes are substantially contained in a plane perpendicular to the corresponding axis of rotation 18 or 19. In the embodiment of FIG. 7 of the drawings, the centrifugal forces that are generated overcome the action of the tension springs 60 and cause the arms 59 to turn downwardly about the pivotal shafts 58 until their longitudinal axes are substantially contained in planes that are perpendicular to the corresponding axes of rotation 18 and 19. The springs 60 effectively serve only to move the arms 59 and the parts which they carry upwardly to an inoperative position when the corresponding rake members 16 and 17 are rotationally at rest.

It will be realised that the lowermost edge of each flexible wall 34 performs a rotational movement over the ground surface in the direction B or C, and, simultaneously, a linear movement in the direction A when the machine is in use. In the embodiment that have so far been described, the lowermost edge of each flexible wall 34 is located in very close proximity to the ground surface and it is emphasised that the flexible walls 34 themselves act as crop displacing members. Although the whole of the external surface of each wall 34 can and will displace any hay or other crop which it engages, it is desirable to enhance the grip of the outer surfaces upon the crop by providing those surfaces with a plurality of projections. Such projections may be in the form of the short tines that have been described and that are illustrated in FIGS. 1 to 7 of the drawings, those tines being disposed in the groups 36, but the use of tines is by no means essential and crop-gripping extensions or projections of the walls 34 may be furnished in the form of a large number of more or less radially extending plate-shaped blades, vanes or the like. The extensions or projections of the outer surfaces of the walls 34 greatly increase the ability of those walls to displace hay or other crop which they engage and, referring to FIG. 1 of the drawings, the rake member 17 will displace hay or other crop which it encounters during its progress in the direction A laterally to the left of that direction towards the rake member 16. As just mentioned, the tine groups 36 greatly enhance the grip of the rake members 16 and 17 upon the hay or other crop which they encounter but it has been found that the length of the extensions or projections, in this case the tine groups 36, may be quite small as compared with the lengths of the tines that are employed in conventional crop raking machines that have at least one rake member that is rotatable about a substantially vertical, or at least upright, axis.

Hay or other crop displaced by the rake member 17 in the machine of FIG. 1 into the region between the two rake members 16 and 17 is further displaced by the wall 34 and tine groups 36 of the rake member 16, such displacement being generally in the direction B and towards the swath board 25. The engaged hay or other crop tends to be released from the rake member 16 in a region thereof which is at the left-hand side thereof and just behind the extension arm 23 as seen in FIG. 1 of the drawings and with reference to the direction A. Crop release in this region is facilitated by the rearwardly swept (with respect to the direction B) disposition of the tines of the groups 26 that has been discussed above. It will be appreciated that the region of release of the crop that has just been discussed is not very sharply defined and will vary considerably having regard to the nature and density of the crop that is being dealt with, its moisture content, the speed of rotation of the rake members 16 and 17 and other operating factors. Nevertheless, generally speaking, the crop displaced by both rake members 16 and 17 is deposited on a strip of ground whose margins are defined by the swath board 25 and a tangential line to the rake member 16 and its tine groups 36 that is located at the left (with respect to the direction A) of that rake member and that extends parallel to the swath board 25 as viewed in FIG. 1. It will be realised that the width of the swath or windrow of crop that is thus formed can be adjusted to some extent by moving the setting tube 26 inwardly or outwardly with respect to the extension arm 23 with the aid of the locking pin 27 or other equivalent setting member. The machine that is illustrated in FIG. 1 of the drawings has been found to produce results that are comparable with those provided by a conventional side delivery rake.

As each wall 34 is flexible in both radial and axial directions relative to the corresponding axis of rotation 18 or 19, the lower edge thereof can readilymatch undulations in the surface of the ground that are met with during operation and, under all normal operating conditions, will not tend to move out of abutment with, or close proximity to, the ground surface even when quite undulating land is met with. This is important because, otherwise, appreciable quantities of hay or other crop tend to be left behind in ground depressions and the like. By virtue of the provision of the resilient supports 33 (FIG. 2), the steel cables 45 (FIG. 4), the rods or strips 49 (FIG. 5) or the rods 54 (FIG. 6), each wall 34 is capable of being completely displaced in position relative to the corresponding axis of rotation 18 or 19. The walls 34 do not necessarily need to move lengthwise of said axes but may tilt about them as the result of forces exerted eccentrically upon lower edge regions of the walls. Owing to the flexible formation of each wall 34, temporary local deformations therein can occur readily, without damage, when, for example, an obstacle is met with. Moreover, a portion of each wall 34 can fold upwardly to some extent relative to the neighbouring wall portions so as temporarily to deform the right circular cylindrical or frusto conical configuration that is assumed by the whole wall when the machine is in use and the wall is not subject to deflecting forces. The walls 34 very rapidly resume their undeflected configurations, under the action of the centrifugal forces that are generated during operative rotation, immediately any obstacle or the like that has caused a deforming deflection has been passed by. The lowermost edge of each wall 34 is thus removed from contact with, or close proximity to, the ground surface for an absolute minimum of time so that very little, if any, hay or other crop is left behind in an undisplaced condition.

The rake member embodiment that is illustrated in FIG. 7 of the drawings is a preferred embodiment in which, it will be noticed, the connections by the chains 61 to the arms 59 are located midway between the uppermost and lowermost edges of the walls 34. This construction results in a very stable position of each wall 34 during operation, the walls 34 being completely displaceable by virtue of their connection to the spokes 57 by the flexible but inextensible chains 61 and the pivotally mounted arms 59. The lower edge region of each wall 34 can readily match undulations in the ground surface in the manner discussed above in the embodiment of FIG. 7 but this facility can, if required, be still further improved by omitting a lower portion of each stiffening strip 62 without altering the point of application of the corresponding chain 61 to that strip. The lower edge region of each wall 34 will then be completely flexible at all points therearound. The stiffening member 35 that is employed in the embodiment of FIG. 2 of the drawings is, for the same reason, arranged at a level of the corresponding wall 34 that is above that of the region of the wall which normally encounters hay or other crop. The provision of such parts as the stiffening members 35 or stiffening strips 62 ensures that the walls 34 will not fold to an excessive extent when those walls are made from very thin and/or lightweight materials. The rake member constructions that have so far been described are not only suitable for employment in machines which have two or more rake members that revolve in the same directions, such as the machine illustrated in FIG. 1, but are equally suitable for use in machines in which two or more rake members rotate in opposite directions during operation or machines that employ only a single rake member.

When the rake members 16 and 17 of the machine illustrated in FIG. 1 of the drawings are to be brought to rest, the three-point lifting device or hitch of the tractor 2 or other operating vehicle is raised prior to, or during, discontinuance of drive to those rake members. The rake member illustrated in FIG. 2 will have substantially the same configuration when it is at rest as when it is rotating except that the weight of the wall 34 will usually cause some degree of downward resilient deformation of the spoke-like supports 33. When the rake member illustrated in FIG. 4 of the drawings is rotationally at rest, the springs 43 will withdraw the extension arms 42 inwardly into the spokes 41 and the diameter of the rake member will be reduced to approximately half the diameter which it had during operation. When the rake member is raised by the lifting device or hitch of the tractor 2 or other vehicle, the cables 45, or equivalent strips, will hang downwardly from the eyes 44 so that the upper edge of the wall 34 will be at a lower level than the spokes 41, the wall 34 then being in an extensively folded condition. When the rake member illustrated in FIG. 5 of the drawings is rotationally at rest and is raised by the three-point lifting device or hitch of the tractor 2 or other vehicle, the rods or strips 49 will hang downwardly in more or less parallel relationship with the corresponding axis of rotation so that the wall 34 will be folded to a very marked extent and its diameter will be much reduced as compared with the diameter during operation. The remarks that have just been made in relation to the embodiment of FIG. 5 of the drawings apply equally to the embodiment of FIG. 6 where the rods 54 hang downwardly from the ball and socket joints 53 when the rake member is raised and is rotationally at rest. In the embodiment of FIG. 7 of the drawings, the arms 59 turn automatically upwards into positions similar to the position that is shown in broken lines in that Figure in respect of one of them under the action of the springs 60 as soon as the speed of rotation of the rake members falls below the value necessary to generate centrifugal forces that will overcome those springs. As illustrated, the chains 61 hang downwardly from the ends of the arms 59, the diameter of the rake member being considerably reduced as compared with its working diameter with the wall 34 automatically adopting a folded configuration. It will be noted that, in the embodiment of FIG. 7, the raised wall 34 will not surround or bear against lower parts of the rake member and that, with this embodiment, it is not strictly necessary to raise the machine clear of contact with the ground for transport purposes although a raised transport position will, in practice, usually be adopted.

The embodiments illustrated in FIGS. 4, 5, 6 and 7 are particularly suitable for use in machines that employ a plurality of rake members since those embodiments have the advantage that, when the rake members are rotationally at rest, their diameters are significantly reduced as compared with their working diameters. As a result, the inoperative transport width of such a machine will usually be considerably less than its operating width. The constructions that have just been mentioned are similarly advantageous for use in single rake member machines whose rake members have greater working widths than the paths of travel of the tractors or other vehicles that operate them.

The way of fastening the tine groups 36 in position that has been described with particular reference to FIG. 3 of the drawings is particularly intended to bring about a stable connection of each such group relative to the portion of the flexible wall 34 of which that group is a neighbour. The first and second tine supporting portions 37 and 38 bear against the inner surface of the wall 34 and, when the tines displace crop or are subject to other forces during the operation of the machine, said portions 37 and 38 are urged against the inner surface of the wall 34. The portions 37 and 38, and the curved portion which interconnects them, are dispersed over an appreciable area of the wall 34 and extend in both vertical and horizontal directions over that area. This arrangement contributes to the satisfactory support of the tine group 36 which will not normally tend to be other than resiliently deflected when subject to operating loads.

FIG. 8 of the drawings illustrates a raking machine having a frame 64 which, as seen in the plan view of FIG. 8, is of substantially isosceles triangular shape with the short base of the triangle foremost with respect to the intended direction of operative travel of the machine that is indicated by an arrow D and the apex thereof (which is imaginary since the triangle is truncated) rearmost. The base of the triangular frame 64 extends substantially perpendicular to the direction D as seen in FIG. 8 of the drawings, said base being constituted by an upright coupling member or trestle 65 of inverted U-shaped configuration while the two opposite sides of the triangle are constituted by hollow beams 66 and 67 (that may be integral with the hollow beam constituting the coupling member of trestle 65), said hollow beams 66 and 67 being substantially horizontally disposed and rearwardly convergent with respect to the direction D. The rearmost ends of the beams 66 and 67 are interconnected by a beam 69 that extends substantially horizontally perpendicular to the direction D, said beam 69 and rear portions of the beams 66 and 67 being also interconnected by an underlying gear box 68 to the top of which they are rigidly secured. A swath board is again provided at the left-hand side of the machine with respect to the direction D and the parts that are indicated by the reference 20 to 27 inclusive in FIG. 8 are identical, or substantially identical, to the parts that have been indicated by the same references in FIG. 1 of the drawings.

Substantially horizontally aligned fastening means 70 are provided at the junctions, which may be integral junctions, between the leading ends of the beams 66 and 67 and the lower ends of the upright limbs of the coupling member or trestle 65 and further coupling means 71, in the form of vertical plates formed with horizontally aligned apertures, are provided centrally at the top of the coupling member or testle 65. The lower fastening means 70 are intended for co-operation with the free ends of the lower lifting links of a three-point lifting device or hitch and the upper fastening means 71 are intended for co-operation with the free end of the upper adjustable lifting link of such a device or hitch. Two tie beams 72 and 73 extend downwardly and rearwardly from the top of the coupling member or trestle 65, at points close to the fastening means 71, in downwardly and rearwardly divergent relationship, the rear ends of said tie beams 72 and 73 with respect to the direction D being rigidly secured to the front of a supporting plate 74 that is disposed substantially vertically perpendicular to the direction D between the beams 66 and 67 at the front of the gear box 68 which latter it also assists in supporting.

The gear box 68 accommodates a shaft 75 which is normally vertically disposed during operation of the machine, a single rake member 76 being rotatable about the vertical or substantially vertical axis of that shaft. the rake member 76 has a hub 68A (FIG. 10) which is located beneath the gear box 68 and to which the inner ends of eight spokes 77 are secured at regular angular intervals of 45°. It should be noted that other numbers of the spokes 77 could equally well be provided. The spokes 77 are rigidly secured to the hub 68A and extend radially with respect to the shaft 75 when viewed in a direction lengthwise of that shaft (FIG. 8). The ends of the spokes 77 that are remote from the hub 68A are interconnected by a rim or felly 78 of circular configuration whose center of curvature is coincident with the longitudinal axis of the shaft 75, said rim or felly 78 being formed from strip material of obling cross-section arranged in such a way that the longer sides of the oblong cross-section are parallel to the axis of the shaft 75 (see FIG. 9). An extension arm 79 is rigidly secured to the outer side of the rim or felly 78 in line with each of the spokes 77, the free outer end of each extension arm being formed with a hole through which a corresponding looped link 80 is passed. The links 80 are also entered through holes in the substantially horizontal limbs of L-shaped brackets 81 whose substantially vertical limbs are clamped to an upper edge region of the corresponding flexible wall 34 by brackets 82 of inverted U-shaped configuration and transverse clamping bolts 83. As can be seen in FIG. 9 of the drawings, the brackets 82 have their substantially vertical limbs located at the opposite inner and outer sides of the wall 34, those limbs being squeezed into clamping engagement with the upper edge region of the wall 34 by the bolts 83, the substantially vertical limbs of the corresponding L-shaped brackets 81 also being located between the inner limbs of the brackets 82 and the inner surface of the wall 34. The tine groups 36 are constructed, arranged and secured in position in the same way as has already been described above with particular reference to FIG. 3 of the drawings.

FIG. 10 of the drawings illustrates a modification of the rake member of FIGS. 8 and 9 in which spokes 84 are provided that do not extend perpendicular to the axis of the shaft 75 but that are inclined downwardly towards the ground from the hub 68A at an angle of substantially 30° to a plane which contains their root ends and which is perpendicular to the axis of the shaft 75. The spokes 84 are, however, radially disposed with respect to the axis of the shaft 75 when the rake member is viewed lengthwise of that axis (FIG. 8). The lowermost and radially outermost end of each spoke 84 is connected to one end of a flexible but inextensible member in the form of a chain 85, the opposite ends of the chains 85 being connected to the stiffening strips 62, carried by the internal surface of the wall 34, in the same manner as has already been described with reference to FIG. 7 of the drawings. The remaining structure of the wall 34, the stiffening strips 62 and the tine groups 36 is the same as has already been described with reference to FIG. 7. Either of the two rake members that have been described with reference to FIGS. 8 to 10 of the drawings may be supported on the ground in the manner illustrated in FIG. 8 by a pair of shoes or skids that can be raised or lowered to alter the height of the rake member with the aid of a crank handle that is rotatable around the axis of the shaft 75 at the top of the gear box 68. Alternatively, at least one of the ground wheels 31 may be employed, said ground wheel or ground wheels 31 being arranged in the same general manner as has already been described above with respect to the single ground wheels of the embodiments of FIGS. 1 to 7 of the drawings.

In the use of the machine illustrated in FIG. 8 of the drawings with the rake member shown in that Figure, or with the alternative rake member of FIG. 10, drive is transmitted to the gear box 68 from the power take-off shaft of an operating tractor or other vehicle to which the coupling member or testle 65 is connected. A telescopic transmission shaft having universal joints at its opposite ends is employed such as the known shaft 13 illustrated in FIG. 1. As the machine moves over the field in the direction D, its single rake member rotates in the direction E that is indicated by an arrow in FIG. 8, the tine groups 36 again being swept back rearwardly from their roots to their tips with respect to the direction E. Since the diameter of the rake member 76 will, at maximum, not exceed the width of the path of travel of the operating tractor or other vehicle by very much, the spokes 77 or 84 may have greater lengths than would be possible if the machine exhibited a plurality of rake members. The wall 34 is of substantially right circular cylindrical configuration during operation of the machine and each spoke 77 or 84 has a length which is between substantially 75% and substantially 85% of the radius of the wall under such conditions when the rake member 76 is viewed lengthwise of the axis of the shaft 75 (FIG. 8). The short pivotable links 80 or chains 85 that interconnect the free ends of the spokes 77 or 84 and the upper edge region of the wall 34 allow that wall its required flexibility and yieldability during operation in substantially all directions. When rotation of the rake member 76 is discontinued and the machine is raised clear of the ground by the three-point lifting device or hitch of the operating tractor or other vehicle, the links 80 or chains 85 will hang downwardly from the spokes 77 or 84 and the wall 34 will automatically assume a partially downwardly folded condition. Inoperative transport of the machine is normally undertaken with the swath board 25 tilted upwardly through substantially 180° about the axis of the pivot 21 which brings it to an inverted position on top of the frame 64 and substantially within the path of travel of the operating tractor or other vehicle. The pivot 21, also, is located within that path of travel so that the swath board 25 and its supporting structure do not add to the width of the machine when it is disposed for inoperative transport. It will be noted from FIG. 8 of the drawings that the short extension arms 79 are not only provided in line with the ends of the spokes 77 but are also secured to the outer surface of the rim or felly 78 at an angular position midway between each pair of spokes 77 so that there is a total of 16 of the extension arms 79. The provision of the rim or felly 78 avoids the necessity for a large number of the spokes 77 since the upper edge region of the wall 34 can be supported from the rim or felly 78 at intermediate points between the spokes 77. The fact that the links 80 and chains 85 are of short length contributes to a stable position of the wall 34 during the operation of the machine with respect to the direction of rotation E of the rake member 76. The driving torque to the rake member 76 is transmitted in a regular manner by the rigid spokes 77 to the wall 34 and it should be noted that the rim or felly 78 increases the rotational inertia of the whole rake member 76 so that the circumferential speed of rotation thereof is quite steady during operation. A rim or felly substantially corresponding to the rim or felly 78 could also be employed in the embodiment of the rake member that is illustrated in FIG. 10 of the drawings.

The flexible connections between the walls 34 and the hubs 28 that are illustrated in the embodiments of FIGS. 2, 5 and 6 of the drawings are rearwardly deflected to some extent in more or less tangential directions as a result of the drive that is transmitted thereto during operation of the machine but, nevertheless, a substantially uniform circumferential speed of movement is obtained. In those embodiments the walls 34 are flexible to a very large extent in both axial and tangential directions with respect to the corresponding axes of rotation.

FIG. 11 of the drawings illustrates a raking machine having a frame which is provided with a coupling member or trestle 86 arranged for connection to the three-point lifting device or hitch of the agricultural tractor 2 or some other operating vehicle. As viewed in the intended direction of operative travel of the machine that is indicated by an arrow F in FIG. 11 of the drawings, the coupling member or trestle 86 is of triangular configuration having fastening means for connection to the upper lifting link of the three-point lifting device or hitch of the tractor 2 or other vehicle at or near its apex and fastening means for connection to the free ends of the lower lifting links of that three-point lifting device or hitch at or near the opposite ends of its substantially horizontally disposed base. A sheet steel support 87 has its leading end with respect to the direction F fastened to the coupling member or trestle 86, said support 87 being of triangular configuration as seen in a vertical section which is not illustrated in the drawings and said support extending rearwardly from the coupling member or trestle 86 with respect to the direction F. The base of the triangular cross-section (not illustrated) that has just been mentioned is substantially horizontally disposed and is located at the top of the support 87, the apex of the substantially isosceles triangular cross-section being located at the bottom of the support. The top of the support 87 is welded or otherwise rigidly secured to the coupling member or trestle 86 adjacent the top of the latter and the leading end of the bottom of said support is welded or otherwise rigidly secured to the base (not visible) of the triangular coupling member or trestle 86. The support 87 is hollow and, as seen in plan view (FIG. 11), its two opposite sides converge gently towards one another in an opposite direction to the direction F. The open front end of the support 87 receives drive from the power take-off shaft of the tractor 2 or other operating vehicle by way of an intermediate telescopic transmission shaft (not illustrated) that may be similar to the shaft 13 illustrated in FIG. 1 of the drawings. The telescopic transmission shaft extends through the support 87 and its rear end may be connected to the splined or otherwise keyed leading end (not visible) of an input shaft 96 (FIG. 12) of a gear box 88 disposed centrally at the top of a single rake member 89 of the machine. The single rake member 89 is rotatable about the vertical or substantially vertical longitudinal axis 90 of a single central shaft which is designated by the reference 29 as that shaft, together with the underlying wheel carrier and ground wheel, are substantially identical to the parts 29/30/31 that have already been described above. A horizontal beam 91 extends substantially perpendicularly transverse to the direction F from the left-hand side of the support (with respect to the same direction) near the rearmost end of that support. The free end of the beam 91 supports a substantially horizontal pivot 92 that is substantially parallel to the direction F and a tubular extension arm 94 is turnable about the pivot 92 relative to the beam 91. When the beam 91 and extension arm 94 are in axial alignment, their neighbouring ends abut against one another so that the arm 94 cannot turn downwardly to any significant extent beyond such a disposition. The arm 94 can, however, be turned upwardly through substantially 180° about the pivot 92 to being a swath board 93 which that arm 94 carries to an inverted inoperative transport position in which it lies on top of the support 87. The swath board 93 is secured to a setting tube 95 that is telescopically slidable inwardly and outwardly in the extension arm 94. The construction and arrangement of these parts is substantially identical to that of the corresponding parts of the machine illustrated in FIG. 1 of the drawings and, in order to avoid unnecessary repetition, reference may be made to the description of the construction and operation of the parts 23 and 25 to 27 inclusive of the machine of FIG. 1.

It will be seen from FIG. 12 of the drawings that the end of the input shaft 96 of the gear box 88 that is located internally of that gear box carries a bevel pinion 97 whose teeth are in driving mesh with those of a larger bevel pinion or crown wheel 98 which is secured by bolts 106 to a flange in an upper region of a hub 99 that surrounds the shaft 29. The bevel pinion or crown wheel 98 and the hub 99 are rotatable around the shaft 29 with the aid of upper ball bearings 103 and lower ball bearings 104 and it will be seen from FIG. 12 of the drawings that the lower end of the hub 99 carries a flange 100, in surrounding relationship with the lower ball bearing 104, to which flange the upper end of a frusto conical support or housing 102 is rigidly secured by bolts 101. It will be noted that the inner races of the upper and lower ball bearings 103 and 104 are maintained in their correct spaced apart relationship axially along the shaft 29 by an inner sleeve 105 that closely surrounds the shaft 29 in non-rotatable relationship therewith, The support or housing 102 is formed from sheet material and the apex of the conical figure which it partially defines is located well above the flange 100 on the axis 90, the central upright axis of the frusto conical support or housing 102 being substantially coincident with the axis 90. The cone angle or apex angle of the conical figure that has just been mentioned should not be less than substantially 60° and not be more than substantially 70°. The bolts 106 that secure the flange at the top of the hub 99 to the bevel pinion or crown wheel 98 also fasten the top of a second frusto-conical support 107 to the parts 98 and 99. As can be seen in FIG. 12 of the drawings, the second support 107 is located between the levels of the upper and lower bearings 103 and 104. The imaginary apex of the conical figure of which the sheet material support 107 forms a part is again located on the axis 90 at approximately the level of the upper ball bearing 103 and the central axis of said figure is again coincident with the axis 90. The cone angle of the second support 107 is not less than substantially 140° and not more than substantially 160°. The maximum diameter of the second support 107 is not less than substantially 1.5 and not more than substantially 2.5 times the maximum diameter of the first support or housing 102, a value of twice the diameter of the support or housing 102 being preferred. The outer periphery of the second support 107 has a downwardly bent over rim 108 whose orientation is such that, in cross-section (FIG. 12), it is parallel to the axis 90. The lowermost and outermost edge of the support or housing 102, on the other hand, is formed with an outwardly bent over rim 109 that is contained in a plane that is substantially perpendicular to the axis 90.

Although omitted from FIGS. 11 and 12 of the drawings means are, in fact, provided for making upward and downward adjustments of the shaft 29 and the ground wheel 31 that is indirectly connected thereto relative to the surrounding rake member to alter the level of that rake member with respect to the ground surface, Such means may be of a kind which is known per se, and incorporates mechanism to enable any chosen one of a plurality of height adjustments to be chosen. As previously mentioned, the axis 90 will usually be substantially strictly vertically disposed but it is also possible to employ the machine with said axis inclined to the vertical to some extent in such a way that an upper region thereof is further advanced with respect to the direction F than is a lower region. The rake member 89 includes a flexible wall which, since it corresponds in most respect to the flexible walls that have already been described, is again indicated by the reference 34. The height of the wall 34 in a direction parallel to the axis 90 is at least as great as the distance between the rim 109 of the support or housing 102 and the rim 108 of the second support 107. In the embodiment which is illustrated, the height of the wall 34 is between substantially 1.2 times and substantially 1.4 times the distance which has just been mentioned, a magnitude of 1.3 times that distance being preferred.

The upper edge region of the wall 34 of the rake member 89 is provided with a plurality, such as four, of stiffening strips 110 that are of inverted L-shaped cross-section. Each strip 110 is of longitudinally curved configuration and its substantially vertical limb is secured to the inner surface of an upper edge region of the wall 34 by bolts, rivets or a suitable strong adhesive. In the embodiment illustrated in FIGS. 11 and 12 of the drawings, there are four of the stiffening strips 110 each of which subtends an angle of substantially 60° at the axis 90, the four strip being regularly spaced apart from one another around that axis. As viewed lengthwise of the axis 90 (FIG. 11), there are two tine groups 36 in register with each strip 110. In the four 30° sectors of the upper edge of the wall 34 that are not provided with stiffening strips 110, there is no other reinforcement of that wall. The substantially horizontal limb of each stiffening strip 110 extends inwardly towards the shaft 29 from the wall 34 and is provided, near its opposite ends, with two vertical bolts 111 to which the ends of inwardly directed flexible but inextensible members in the form of chains 112 are connected. The opposite inner ends of the chains 112 are indirectly connected to the second support 107 by corresponding resilient brackets 113 fastened to the lower surface of the support 107. Each resilient bracket 113 is preferably formed from spring steel wire and is substantially contained in a corresponding radial plane that also contains the axis 90. As shown in FIG. 12 of the drawings, one end of the illustrated bracket 113 is secured to the lower surface of the support 107 near to the rim 108 from which location it is entered outwardly through a hole in that rim beyond which it is bent over through substantially 180° to form a straight portion that is directed inwardly towards the axis 90 in very slightly convergent relationship (in cross-section) with the overlying support 107. The radially innermost end of the straight portion which has just been mentioned then merges into a bent portion of substantially S-shaped configuration and the opposite end of this bent portion merges into a further curved portion whose uppermost and radially innermost end is fastend to the lower surface of the overlying support 107 at a location approximately midway between the innermost and outermost edges of said support 107. FIG. 12 of the drawings illustrates the rake member 89 in an operative condition in which the inner ends of the chains 112 engage the resilient brackets 113 by the substantially 180° bends that are located outwardly beyond the rim 108, However, when the rake member 89 is rotationally at rest, the inner links of the chains 112 can be slid inwardly along the straight portions of the brackets 113 until they meet the S-shaped portions thereof and can be moved downwardly into the depressions defined between the S-shaped portions and the final innermost curved portions of the brackets 113. This will be evident from a study of FIG. 12 of the drawings and has the effect that, in an inoperative transport position of the raking machine that incorporates the member 89, the chains 112 will be reliably retained in inwardly withdrawn positions. It will be noted from FIG. 11 of the drawings that, as viewed in a direction lengthwise of the axis 90, the outer end of each chain 112 is disposed quite close to a corresponding one of the eight tine groups 36.

Approximately the lower half of the height of the wall 34 is provided with four stiffening strips 114 of shallow channel-shaped cross-section that are disposed with the broad bases thereof upright and the shallow limbs thereof substantially horizontal. The strips 114 are formed from sheet material and the limbs thereof project inwardly towards the axis 90 through substantially the same distance as do the inwardly directed limbs of the stiffening strips 110. The four stiffening strips 114 are in substantial register with the four stiffening strips 110 in directions parallel to the axis 90, each strip 114 thus also subtending an angle of substantially 60° at said axis. The strips 114 are secured to the material of the wall 34 by bolts, rivets or a suitable adhesive. Flexible but inextensible members in the form of upper and lower chains 115 and 116 extend between the corresponding upper and lower limbs of each stiffening strip 114 and the rim 109 of the support or housing 102. The chains 115 and 116 are in substantial register with the chains 112 as viewed lengthwise of the axis 90, their radially outer ends being releasably fastened to the upper and lower limbs of the strips 114 by upper bolts 117 and lower bolts 118 while the inner ends thereof are releasably fastened to the rim 109, in upper and lower pairs, by single bolts 119, During the operation of the machine, as will be evident from FIG. 12 of the drawings, the upper chains 115 are inclined upwardly and outwardly from the rim 109 to the upper limbs of the corresponding fastening strips 114 whilst the lower chains 116 are inclined outwardly and downwardly from said rim 119 to the lower limbs of the corresponding strips 114. The chains 112 extend outwardly, and downwardly to a small extent, from the resilient brackets 113 to the stiffening strips 110 under the same conditions. As viewed lengthwise of the axis 90 (FIG. 11), all of the chains 112, 115 and 116 extend substantially radially during operation. Since the chains 115 and 116 are in substantial register with the chains 112 as viewed in the direction which has just been mentioned, it will be evident that their connection points to the upper and lower limbs of the strips 114 are located close to the opposite ends of those strips. The tine groups 36 are also located near the opposite ends of the stiffening strips 114 and are retained in position by bolts 120 that extend through the wall 34 and through the corresponding strip 114 at levels substantially midway between the upper and lower limbs of those strips. The construction and arrangement of each tine group 36 may otherwise be substantially identical to that which has already been described except that the free end or tip of the lower tine of each group is located at a lower horizontal level than is the bottom edge of the wall 34 (see FIG. 12) and said tines are substantially radially disposed with respect to the axis 90 instead of being swept back rearwardly with respect to the intended direction of operative rotation of the rake member 89 that is indicated by an arrow G in FIG. 11.

FIG. 13 of the drawings illustrates a modification in which a curved wear-resistant strip is fastened to the lower surface of the lower limb of each stiffening strip 114. The wear-resistant strips 121 may be made from materials such as hardened steel or a synthetic plastics material having the necessary properties and it is preferred that said strips should be thick as compared with the thickness of the material of the strips 114. Each wear-resistant strip 121 subtends substantially the same angle at the axis 90 as does the corresponding stiffening strip 114 and, as a consequence, said strips 121 are not provided in the four substantially 30° gaps that exist around the axis 90 between the strips 114. It has been mentioned above that the outer surface of the wall 34 may advantageously be provided with extensions, projections or the like to improve the grip of the wall 34 or hay or other crop that is met with during a raking operation. Such extensions, projections or the like are not really comparable with the tines of known rotary rake members. In the machine which is being described with reference to FIGS. 11 to 13 of the drawings, fillets 122 formed from sheet material of substantially L-shaped cross-section are provided between the tine groups 36, each fillet 122 extending substantially parallel to the axis 90 when the machine is in operation and being arranged with one of its limbs in abutting contact with the wall 34 and the other limb in substantially perpendicular relationship with a tangential plane to that wall. Each outwardly projecting radial limb has an extent in the radial direction (FIG. 11) which is between substantially 20% and substantially 30% of the extent of one of the tine groups 36 in the same direction. As previously mentioned, there is one of the fillets 122 between each tine group 36 around the circumference of the rake member 89 and it will be noted from FIG. 11 of the drawings that the fillets 122 are not disposed midway between the tine groups 36 but are closer to the groups 36 which are behind them with respect to the intended direction of operative rotation G than they are to the groups that are in front of them with respect to that direction. Alternate fillets 122 are secured to regions of the wall 34 that are stiffened by the strips 114 and to regions of the wall 34 that are unstiffened. The fillets 122 are secured to the wall 34 by bolts, rivets or a suitable adhesive.

In the use of the raking machine that has been described with reference to FIGS. 11 to 13 of the drawings, the rake member 89 is caused to rotate in the direction G by drive derived from the power take-off shaft of the tractor 2 or other operating vehicle through the intermediary of a telescopic shaft that may be similar to the known shaft 13. This telescopic transmission shaft drives the rotary input shaft 96 which, in turn, rotates the supports 102 and 107 of the rake member 89 by way of the bevel pinion 97, the bevel pinion or crown wheel 98 and the hub 99. The lowermost edge of the wall 34 is only a short distance above the ground surface during operation of the machine and, accordingly, the free end or tip of each lower tine of each group 36 is in very close proximity to the ground surface during all of its rotation or, at least, during a portion thereof in the event that the axis 90 is inclined to the strictly vertical to a significant extent. The lowermost edge of the wall 34 displaces hay or other crop which it engages in the direction F (FIG. 11) and also in the direction G, the tine groups 36 and the fillets 122 very significantly increasing the displacing effect of said wall. The displaced hay or other crop is ejected from the rake member 89 towards the swath board 93 until it meets the ground surface which rapidly brings it to rest. The adjustable swath board 93 sharply defines the left-hand side (with respect to the direction F) of the swath or windrow of hay or other crop which is formed while the right-hand side of that swath or windrow is defined by the wall 34 itself which wall, although being rotatably movable, acts as a swath board in the region in which it faces the true swath board 93. If the machine is to be used principally for the formation of swaths or windrows, it is preferably, but is not essential, that the tines 36 should be arranged in the manner previously described with reference to FIG. 1 of the drawings in which they are rearwardly swept back from root to tip with respect to the intended direction of operative rotation G of the rake member 89. When the machine is to be used to spread the crop over the ground in more or less random fashion in the manner of a tedder, it is only necessary to turn the swath board 93 and the parts by which it is carried upwardly about the pivot 92 through substantially 180° to bring it to an inverted inoperative position in which it will not be contacted by displaced crop. As in the preceding embodiments, the wall 34 can yield radially when an undulation or obstacle is encountered and can also deflect upwardly in directions generally parallel to the axis 90.

However, in the case of this embodiment, larger wall portions will deflect flexibly with respect to other wall portions as compared with the preceding embodiment because said larger wall portions are those which are stiffened by the strips 114. Such larger wall portions will, accordingly, move relative to the neighbouring unstiffened wall portions but they can, of course, also yield upwardly because of the unstiffened areas of the wall 34 that lie between the strips 114 and the strips 110. If the material that is chosen to form the wall 34 is of insufficient inherent rigidity, the stability of position of the tine groups 36 and fillets 122 can be increased by providing extra stiffening for the wall 34 in the regions of said tine groups and fillets. Sufficient yieldability will still be retained by the wall 34 to allow portions thereof to move more or less radially and/or more or less axially relative to further wall portions when required.

FIG. 14 of the drawings illustrates two rake members 123 and 124 of a raking machine that are mounted in a frame (not illustrated) of that machine in such a way as to be rotatable, during operation, in opposite directions J and K respectively about corresponding parallel and truly vertical or nearly vertical axes 90. It will be noted from FIG. 14 of the drawings that, with this arrangement, regions of the walls 34 of the two rake members 123 and 124 move rearwardly in close proximity to one another midway between the axes 90 in a direction generally opposite to the intended direction of operative travel H of the machine. The paths traced by the tips of the tine groups 36 of the two rake members 123 and 124 do not, however, overlap one another to any significant extent in this embodiment and it is preferred that, as viewed lengthwise of the axes 90 (FIG. 14), said paths should merely touch each other. Many parts of the rake members that are illustrated in FIG. 14 of the drawings, and those that are illustrated in the embodiments of following FIGS. 15 to 18 of the drawings, correspond exactly or very closely to parts that have already been described with reference to earlier embodiments and such parts are, accordingly, denoted by the same references in FIGS. 14 to 18 of the drawings as have been employed for the corresponding parts in earliers Figures of the drawings. The outer surface of each wall 34 is again provided with fillets 125 between the tine groups 36 and these fillets are substantially identical in construction and arrangement to the previously described fillets 122 except that the outermost edges of their radial limbs are serrated in saw-tooth fashion (see FIG. 15). Once again, the fillets 125 are secured alternately to stiffened and unstiffened portion of each wall 34 as considered circumferentially around those walls.

In order to maintain the walls 34 in substantial stable positions relative to the supports 102 and 107 with reference to the directions of rotation J and K, flexible but inextensible members 126 are provided in the embodiment of FIG. 14 of the drawings, said members 126 preferably being afforded by lengths of steel cable, nylon or other suitable synthetic material cable or by chains. Each member 126 may conveniently, as illustrated in FIG. 14, have its leading end with respect to the direction J or K coupled to one of the anchorage bolts 119 (FIG. 12) and its rearmost end with respect to the same direction coupled to the lower anchorage bolt 118 which is nest nearest to the rear, again relative to the direction J or K. It is thus the lower anchorage bolts 118 that are at the leading ends of the fastening strips 114 with respect to the directions K and J that are coupled to the flexible but inextensible members 126. It is also possible to dispose the members 126 between the single anchorage bolts 119 and the upper anchorage bolts 117 that are in register with the lower bolts 118 whose positions have just been described. The members 126 may also be provided in pairs between the single bolts 119 and upper and lower bolts 117 and 118 that are next rearmost therefrom relative to the directions J and K. The provision of the flexible but inextensible members 126 does not inhibit desirable local deformations of the walls 34 but merely ensures that the lower edge regions of those walls do not drag unduly when, for example, heavy accumulations of crop are met with which circumstances, in the absence of the members 126, might cause too great a degree of folding of the lower edge regions of the walls 34 and undesirable upward deflection of those regions.

Each of the rake members 123 and 124 has a plurality of tine group mountings 127 of which details can be seen in FIGS. 15, 16 and 17 of the drawings. Each mounting 127 is located wholly internally of the corresponding wall 34 and each corresponding tine group 36 comprises an upper tine 128 and a lower tine 129, said tines projecting outwardly through an opening 130 in the material of the wall 34 and through a registering opening of the same size in the corresponding stiffening strip 114. Each opening 130 is flanked at the internal side of the wall 34 and corresponding stiffening strip 114 by a pair of parallel console plates 131, both console plates 131 being perpendicular to a tangential plane to the corresponding wall 34 taken at a point midway between them. The two console plates 131 of each pair are symmetrically identical and their outermost edges have flanges which are riveted or bolted to the corresponding wall 34 and stiffening strip 114. As seen in elevation (FIG. 16), each console plate 131 is of substantially triangular configuration, the edges of the triangle being denoted by the reference 132 and the triangle base being disposed against the corresponding stiffening strip 114 and substantially parallel to the axis 90 concerned. The apex regions of the two substantially triangular console plates 131 of each pair (i.e. regions thereof that are radially innermost with respect to each axis 90) support corresponding pivotal shafts 133 whose axes are normally perpendicular to the axes 90. Apart from the tines 128 and 129 themselves, the mountings 127 thereof are substantially symmetrical at opposite sides of planes 134 (FIGS. 17 and 18 of the drawings) that contain the axis 90 concerned and the midpoint of the mounting 127 under consideration. Two strips 135 and two strips 136 are located in pairs at opposite sides of the plane 134 so as to be freely turnable about the shaft 133, the upper edges of the two strips 135 registering with the upper edges 132 of the console plates 131 and the lower edges of the strips 136 registering with the lower edges 132 of those plates. A tie plate 137 perpendicularly interconnects the two outer strips 135 near the upper ends of those strips and, similarly, the two inner strips 136 are perpendicularly interconnected by a parallel, but larger, tie plate 138, the tie plate 138 being located towards the lower ends of the strips 136. A sleeve 139 is arranged between the two tie plates 137 and 138 with its longitudinal axis perpendicular to the general planes of those tie plates. The pivotal shaft 133 is surrounded, between the two strips 136, by a coil spring 140 one end of which is anchored to the lower tie plate 138 in the manner illustrated in FIG. 16 of the drawings while the opposite and upper end thereof if formed as a hook 141 that is engaged with a locking lever 142. The locking lever 142 is turnable by downwardly directed lugs about the pivotal shaft 133 and its free end is located above the upper tie plate 137 and the sleeve 139. The lever 142 is of stepped formation (see FIG. 16) and is engaged by the hook 141 at a location quite close to the pivotal shaft 133. The spring 140 tends to turn the lever 142 in a clockwise direction about the shaft 133 as viewed in FIG. 16 of the drawings and, the free end region of that lever 142 bears downwardly against the upper end of a long bolt 143 that is entered axially through the sleeve 139 to clamp that sleeve between the upper and lower tie plates 137 and 138.

The inner end of the upper tine 128 merges into helical coils 144 that are wound coaxially around an upper region of the sleeve 139. The inner end of the lower tine 129 merges into coils 145 that are similarly arranged around a lower end region of the sleeve 139. The two sets of coils 144 and 145 are integrally interconnected by a bend 146 of C-shaped configuration and it will thus be evident that the two tines 128 and 129, the coils 144 and 145 and the bend 146 are all made from a single length of material which material should be resilient and is preferably spring steel rod. The bend 146 is directed inwardly towards the axis of rotation 90 from the sleeve 139 and it will be evident from FIG. 17 of the drawings that is is clamped without significant play between on edge of a tapering portion of the lever 142 and the facing side of a neighbouring one of the strips 136. It can also be seen from FIG. 16 of the drawings, that, in fact, one of the bends in the stepped lever 142 abuts clampingly against the tine material bend 146. The strips 135 and 136, the tie plates 137 and 138, the sleeve 139, the bolt 143 and the two tines 128 and 129 constitute a single unit which is freely pivotable about the shaft 133 and, during the use of the machine, that unit will tend to occupy substantially the position illustrated in FIG. 16 of the drawing under the action of the centrifugal forces that are generated by rotation of the corresponding rake member 124. When the rake member 124 is rotationally at rest, the unit which has just been mentioned will turn downwardly about the shaft 133 until the lower tine 129 thereof bears against the lower edge of the opening 130. In the position of the tine group 36 that is shown in full lines in FIG. 17 of the drawings, the tines 128 and 129 thereof extend substantially radially with respect to the axis 90, such position thereof being the most suitable for tedding and like crop-spreading operations. However, the tine group 36 can be adjusted to a position in which its tines 128 and 129 trail, or are swept back rearwardly, from root to tip with respect to the corresponding direction of rotation K (FIG. 14), such position being indicated in broken lines in FIG. 17 and being a position which, as previously discussed, is to be preferred for swath or windrow formation by the machine. The adjustment is made by turning the lever 142 upwardly about the shaft 133 until it is clear of the bend 146 interconnecting the tine coils 144 and 145 (FIG. 16). Such upward turning of the lever 142 is accomplished against the action of the coil spring 140 and, after the condition which has just been described has been attained, the tine group 36 is turned as a whole about the sleeve 139 in the direction indicated by an arrow L in FIG. 17 of the drawings, the coils 144 and 145 being freely turnable about the sleeve 139. The bend 146 will then abut against the other one of the two strips 136 and, upon releasing the lever 142, the spring 140 will return it to a clamping position in which the opposite edge of the tapering portion of said lever keeps the bend 146 against the strip 136 that has just been mentioned without significant play.

In the alternative construction shown in FIG. 18 of the drawings, a tine support 147 that is of generally U-shaped configuration as seen in plan view has its limbs turnably arranged around the pivotal shaft 133. A top plate 148 is welded to otherwise rigidly secured to the upper edges of the limbs and the base of the support 147 in such a way that the plane of the top plate 148 is parallel to the axis of the shaft 133. A similar bottom plate (not visible in FIG. 18) is welded or otherwise rigidly secured to the lower edges of the limbs and base of the support 147 in parallel relationship with the top plate 148. A sleeve 149 is turnably mounted in holes in the top plate 148 and juxtaposed bottom plate at a position close to the opening 130 in the wall 34 and similar opening in the stiffening strip 114. The sleeve 149 is surrounded by the tine coils 144 and 145 in a similar manner to that which has been described above but, in this case, said coils are not freely turnable about the sleeve and the junction between them is rigidly secured to the sleeve in a manner which may be known per se by, for example, the transverse bolt that is visible in FIG. 18 of the drawings. The upper end of the sleeve 149 projects above the top plate 148 and has a lever 150 welded or otherwise rigidily secured to it. The lever 150 is formed with a hole which, by turning the sleeve 149 and the tine group 36 about the axis of that sleeve, can be brought into register with any chosen one of an arcuate row of holes 151 in the top plate 148, the center of curvature of the arcuate row being coincident with the longitudinal axis of the sleeve 149. A locking pin 152 is provided for entry through the hole in the lever 150 and the chosen hole 151 to maintain the sleeve 149 and the tine group 36 in a corresponding angular setting relative to the support 147 about the axis of said sleeve 149. It will be evident from FIG. 18 of the drawings that the tine group 36 can be set in the substantially radial position (with respect to the axis 90) that is indicated in full lines and that is suitable for tedding and like crop-spreading operations or in any of a plurality (four, in the illustrated example) of progressively more trailing or rearwardly swept back positions relative to the corresponding direction of rotation J or K. This construction gives the additional facility of adopting any chosen one of a plurality of different positions that are suitable for the formation of swaths or windrows, the nature and desity of the hay or other crop that is being dealt with and other operating conditions being the factors that dictate the particular hole 151 that is chosen for co-operation with the locking pin 152 to determine the angular setting of the tine group 36. The single unit that comprises the tine support 147, its top plate 148 and corresponding lower plate, the sleeve 149 and the tine group 36 is agains freely pivotable about the shaft 133 as in the embodiment of FIGS. 16/17. It will be self evident that the descriptions which have been given of two alternative forms of tine mounting 127 apply equally to each mounting 127 of the rake members 123 and 124.

When the tines 128 and 129 are substantially radially disposed with respect to the corresponding axis 90 as viewed lengthwise of that axis, or when they are in advance (with respect to the direction J or K), rather than to the rear, or a radial plane that contains the axis 90 and the root or inner ends of the tines, hay or other crop that is engaged thereby and by the fillets 125 and the wall 34 itself will be carried further in the directions J and K in a direction more or less opposite to the direction H than when the tines occupy trailing or rearwardly swept back positions relative to the directions J and K. The truly radial or advanced positions of the tines 128 and 129 are suitable for producing a tedding or crop-spreading action in which the crop is spread more or less at random over the field in a diffuse manner whereas the rearwardly swept positions of the tines are much more suitable for the formation of hay or other crop into a swath or windrow. In the former case, the crop is spread over quite a wide area at the machine whereas, in the latter case, it tends to be deliverend onto a much narrower strip of land. If desired, the machine of which the rake members 123 and 124 form parts may be provided with two crop guide members which can be arranged behind the rake members with respect to the direction H (FIG. 14) to guide hay or other crop displaced by those rake members positively into a narrow swath or windrow. The crop guide members may take the form of swath boards or assemblies of resilient guide rods or the like that define a rearwardly convergent passage and that are substantially symmetrical with respect to a vertical plane extending in the direction H midway between the two axes of rotation 90. When the crop guide members (not illustrated) are employed, the tines 128 and 129 will normally and preferably be arranged in their rearwardly swept or trailing positions with respect to the directions J and K.

FIG. 19 of the drawings somewhat diagrammatically illustrates a rake member 155 whose wall 34 is arranged on an upper annular supporting ring 154 that is connected to the outer ends of spokes 153 by bolts. The wall 34 depends from the ring 154 to near the ground surface and is made of a flexible material like the walls 34 in the preceding embodiments. As will be evident from FIG. 19 of the drawings, the disposition of the rake member 155 in this embodiment is such that its axis of rotation is inclined at a smaller acute angle to the vertical and a larger acute angle to the horizontal in such a way that an upper region of said axis is further advanced with respect to the intended direction of operative travel M of the machine of which the rake member forms a part than is a lower region of that axis. The axis of rotation can, nevertheless, be considered as being a substantially vertical axis. A lower edge region of the wall 34 that is furthest advanced with respect to the direction M moved directly over the ground surface in very close proximity, or actual contact, therewith. Since the wall 34 is flexible, contact of its lower edge region with the ground surface will only means that a local yielding of the wall will take place in a direction more or less parallel to the axis of rotation. The rearmost region of the lower edge of the wall 34 with respect to the direction M is, as will be seen in FIG. 19 of the drawings, appreciably spaced above the ground surface. The whole of the lower edge region of the wall 34 may be stiffened to some extent as compared with an overlying region thereof but will still be flexible, said region being provided, on the radially inner surface of the wall, with a plurality of groups 156 that each comprise two tines 157 and 158. The two tines 157 and 158 of each group are preferably contained in, or are only slightly inclined to, a radial plane which contains the axis of rotation of the rake member 155. The two tines 157 and 158 both extend inwardly and downwardly towards the ground surface from an integral fastening portion thereof that is secured to the inner surface of the wall 34. These downwardly and inwardly inclined portions merge at their lower and inner ends into bends having magnitudes of between substantially 120° and substantially 160°, the bends being so disposed that short straight free end regions of the tines 157 and 158 are directed outwardly towards the wall 34 at an inclination to the axis of rotation which may conveniently (as illustrated), but not essentially, be 90°. The tines 157 and 158 are so shaped that they are located wholly within the right circular cylindrical configuration that the wall 34 has during operation, considered lengthwise of the axis of rotation, but the free end regions of said tines 157 and 158 are located at a short distance below the lower edge of the wall 34. It is noted that the rake member 155 illustrated in FIG. 19 of the drawings may also be provided with the previously described tine groups 36 but that such groups are not illustrated in FIG. 19.

In the use of a machine comprising at least one of the rake members 155, with or without the tine groups 36, the wall 34 will displace crop which it engages in the direction M and, simultaneously, in the direction of rotation of the rake member 155. Conditions can be met with in which, for example, upright plants continue to grow through mown crop and, under such conditions, at least some of these plants can pass beneath the very flexible wall 34 and be missed by the rake member. The provision of the tine groups 156 considerably improves the action of the rake member 155 under such conditions since such standing plants are engaged by the free end portions of the tines 157 and 158 which tines can be considered as being post-raking members. The plants which are engaged by the tines 157 and 158 are carried round thereby to the rear and to one side of the rake member with respect to the direction M and are eventually ejected therefrom beneath the lower edge of the wall 34. The actual point of ejection will depend upon several factors and, particularly, upon the radial or other setting of the tines 157 and 158. It may be noted that it is desirable for the free end portions of the inner tines 158 to be located at a slightly lower level than the free end portions of the outer tines 157 with respect to the axis of rotation of the rake member 155 to ensure that both tines 157 and 158 of each group 156 will engage the ground surface at the front of the rake member 155 with respect to the direction M as will be evident at the righthand side of FIG. 19 of the drawings. The particular relative heights of the free end portions of the tines 157 and 158 can be adapted to the inclination of the plane of rotation of the lower edge of the wall 34 to the ground surface that is usually employed.

FIG. 20 of the drawings illustrates a construction of the rake member 155 in which the wall 34 is again secured to the outer surface of a downwardly directed rim of the annular supporting ring 154. The wall 34 is, as in the previous examples, made from a flexible material such as waxed cloth, a synthetic plastics material, rubber or the like. The lowermost edge of this wall 34 is very close to, or in actual contact with, the ground surface, the wall assuming the shape of a right-circular cylinder during operation due to the centrifugal forces that act thereon at such times. The lower edge region of the wall 34 can match undulations in the ground surface, and avoid obstacles, by deflecting yieldably in any required direction to do so, the centrifugal forces causing the deflected region of the wall immediately to assume its undeflected shape as soon as the undulations or obstacle has been passed. The rake member rotates in the direction indicated by the arrow N in FIG. 20 and the wall 34, and the tines of groups 159 that will be described below, displace hay or other crop which they engage in the direction N and in the direction M (FIG. 19), to produce a swath or windrow at one lateral side of the rake member 155. A plurality of the tine groups 159 are provided beyond the radially external side of the wall 34, the tines of the neighbouring groups 159 being spaced apart from one another in the direction N by a distance that is less than the length of an active or crop working portion of one of the tines. Each tine group 159 is mounted on a corresponding radially orientated support 160 that is fastened to the top of the supporting ring 154, some of the supports 160 being radial extensions of the spokes 153 (FIG. 19). The tines of each group 159 extend downwardly from their fastening points on the corresponding support 160 and have free end portions 161 which, viewed lengthwise of the axis of rotation of the rake member 155, may be radially disposed (as illustrated) or rearwardly swept back or trailing with respect to the direction N.

FIGS. 21 and 22 of the drawings illustrate a construction of the rake member 155 in which tine groups 164 are disposed radially outside the wall 34, each tine group 164 comprising four tines that are located one above the other with each tine inclined outwardly and downwardly towards the ground surface during operation of the machine of which the rake member 155 forms a part. The four tines of each group 164 are made in two integral pairs from two lengths of spring steel wire or thin steel rod, the junctions between the two tines of each pair being fastened to a single tine support 162 which also extends outwardly and downwardly towards the ground surface during operation of the machine. Each support 162 is turnable about a corresponding pivot 163 whose axis is tangential to a circle centered upon the axis of rotation of the rake member, each pivot 163 being located on a corresponding locking plate 167 mounted in an upright manner on the top of the supporting ring 154. A tubular crop catch 165 is carried near the upper end of each tine support 162 so as to lie above the corresponding tine group 164 with the effective portion thereof located forwardly of that tine group with respect to the direction N. As will be evident from FIG. 21 of the drawings, the effective portion of each crop catch 165 that has just been mentioned is substantially radially disposed and is connected to the corresponding support 162 by an inwardly and rearwardly (with respect to the direction N) inclined portion. Each support 162 includes a lug formed with a hole which will register with a hole in the locking plate 167 and through which aligned holes a substantially horizontal locking pin 166 can be entered to retain the support 162 and the parts which it carries in the operative position illustrated in FIG. 21 of the drawings and in full line in FIG. 22 thereof. It will be noted that, in this embodiment, a lower region of the wall 34 is provided with a plurality of tine groups 36 that are generally similar in construction and function to the corresponding groups that have been previously described. The lower region of the wall 34 that carries the tine group 36 is preferably, but not essentially, stiffened to some extent as compared with an overlying region of the wall 34. It will be clear from FIGS. 21 and 22 of the drawings that the active or crop working portions of the tines 36 are swept back rearwardly or trailing from root to tip with respect to the direction N and are also inclined downwardly towards the ground surface from root to tip.

In the use of a machine comprising the rake member 155 in the form which has been described with reference to FIG. 20 of the drawings, the tine groups 159 will displace hay or other crop which they encounter and will either spread that crop over the ground in the manner of a tedder or will form in into a swath or windrow in dependence upon the angular settings of the free end portions 161 of the tines as has been discussed earlier in this Specification. Any crop non engaged by the tines of the groups 159 is displaced by the wall 34 itself which wall, in this embodiment, serves as a post-raking member. The wall 34 is again of sufficient flexibility to allow it to yield temporarily in any required direction during the operation of the machine.

In the use of a raking machine incorporating the rake member 155 in the form illustrated in FIGS. 21 and 22 of the drawings, the tine groups 164 engage and displace hay or other crop which they encounter while the overlying and relatively forwardly disposed crop catches 165 displace upper portions of any thick layers or swaths of crop that may be encountered. Any such accumulations tend to be carried along in the cavities that are formed between the catches 165 and the tines 164 (see FIG. 21). As the tines 164 extend substantially radially when the rake member 155 is viewed lengthwise of its axis of rotation, the hay or other crop will be carried along by the rake member 155 for a greater length of time than would be the case if the tines were swept rearwardly with respect to the direction N. Accordingly, the tine groups 164 are particularly suitable for tedding and other crop spreading operations. A second working position of the rake member 155 is, however, obtainable by releasing each locking pin 166 and turning the tine supports 162 upwardly and inwardly about the pivots 163 until they reach positions substantially corresponding to the position of one of them that is shown in broken lines in FIG. 22. In this broken line position, the free end portions of the crop catches 165 bear against the inner surface of the wall 34 so that, during operation, it will be the wall 34 itself and the tine groups 36 that will first engage and displace hay or other crop rather than the tine groups 164. Since the tines of the groups 36 are swept back rearwardly or trailing with respect to the direction N from root to tip, the hay or other crop which they engage will be released more rapidly than when the tines of the groups 164 first engage the crop so that, in this second working position, the machine will function to collect the displaced hay or other crop into a swath or windrow. The tines of the groups 164 are ineffective in the second working position that has just been described but it will be noted that the free end portions of the crop catches 165 are urged against the inner surface of the wall 34 by the centrifugal forces that tend to turn then about the pivots 163 when the rake member 155 is rotating. The crop catches 165 thus tend to stiffen the wall 34 to some extent, the stiffening effect being dependent upon the lengths of the portions of the catches 165 that are in contact with the wall 34 and the speed of rotation of the rake member 155.

FIGS. 23 and 24 of the drawings illustrate a raking machine having many parts that are similar, or identical, in construction and function to parts of the machine that has already been described with reference to FIGS. 1 to 3 of the drawings. Accordingly, such parts are designated by the same references as have already been used in FIGS. 1 to 3 of the drawings. The machine of FIGS. 23 to 24 differs from the previously described machine that has just been mentioned in that the tubular frame beam 8 extends substantially horizontally perpendicular to the intended direction of operative travel H rather than obliquely transverse to that direction. As a consequence, the tubular beams 6 and 7 both have the same length. The two rake members 16 and 17 of the embodiment of FIGS. 23 and 24 of the drawings are arranged to rotate in the opposite directions J and K rather than the same directions B and C shown in FIG. 1 of the drawings. The machine of FIGS. 23 and 24 of the drawings preferably includes crop guide members arranged substantially centrally behind the rake members 16 and 17, such crop members being symmetrical with respect to a vertical plane extending in the direction H at a location midway between the axes of rotation 18 and 19 and being comprised by swath boards, assemblies of resilient guide rods or the like that define the opposite sides of a passage that is gently convergent in a direction opposite to the direction H and that function to form hay or other crop received from the rake members at the leading end of that passage into a neat and compact swath or windrow.

Description will now be given of various embodiments of the rake members 16 and 17 of the machine shown generally in plan view in FIG. 23 and that description will be confined to the rake member 17 since the rake member 16 is substantially symmetrically identical thereto. In these embodiments, each wheel carrier 30 is inclined forwardly with respect to the direction H from the lower end of the corresponding rod or shaft 29 so that the ground wheels 31 will be considerably closer to the leading regions of the walls 34 with respect to the direction H than would otherwise be the case (as in the embodiment of FIGS. 1 to 3). The spoke-like supports 33 are preferably formed from spring steel but, as an alternative, they may be replaced by rigid members such as tubular beams of light weight whose inner ends are rigidly secured to the hub 28 and/or to the annular flange 32. Moreover, in order to limit the width of the machine to as low a magnitude as possible for inoperative transport purposes, the supports 33 may be turnable about substantially horizontal pivots relative to the flange 32 or to the hum 28 if the flange 32 is omitted. It also is possible to replace the supports 33 by freely flexible, but substantially inextensible, members such as chains. In any case, the radially outer ends of the supports 33 are secured by bolts to a ring 168 of channel-shaped cross-section that is arranged with its base upright and its inwardly directed limbs substantially horizontal. The bolts which have just been mentioned connect the outher ends of the supports 33 to the upper limb of the channel-shaped cross-section ring 168. An upper region of the flexible wall 34 is secured to the outer surface of the web or base of the ring 168 by bolts, said ring 168 stiffening the wall 34 in its upper region. A stiffening tape 169 is secured to the internal surface of a lower region of the whole wall 34 by bolts, rivets, staples or other wire or by a suitable adhesive, said tape extending upwardly from the lowermost edge of the wall 34 throughout a distance which is between substantially 20% and substantially 40% of the height of the wall 34 in a direction parallel to the axis 19, substantially 30% of that height being the preferred extent of the tape 169. The stiffening tape 169 may, as an alternative, be secured to the external surface of the wall 34 instead of, or in addition to, the internal surface thereof. A still further alternative is to employ the tape 169 alone beyond the lower edge of the wall 34, the wall and tape being secured to one another in a narrow overlapping region. With this construction, the tape 169 itself will function as a portion of the wall 34. The tape 169 is preferably made from textile or other material in strip form, such material having a significantly lower degree of flexibility than that chosen to form the wall 34 itself. The tape 169 may be made of reinforced rubber, a synthetic material or canvas but, since at least its lower edge will be in frequent contact with the ground surface, it may advantageously include metal parts such as plates or chains defined to resist wear.

The whole of the lower edge region of the wall 34 that is reinforced by the stiffening tape 169 carries regularly spaced apart tine groups 36 which are secured to the wall 34 and to the tape 169 by bolts. In this embodiment, the rake member 17 has 32 tine groups 36 and it will be seen from the drawings that the two tines of each group are contained in a corresponding substantially vertical plane and are spaced apart from one another by a perpendicular distance which is equal to substantially 60% of the height of the tape 169 in a direction parallel to the axis 19. Each tine groups 36 has substantially the same construction as has already been described with reference to FIGS. 1 to 3 of the drawings.

In the embodiment illustrated in FIG. 25 of the drawings, the ring 168 has the upper ends of a plurality, such as twelve, of strip-shaped elements 170 fastened to it at regularly spaced intervals around the axis 19. The securing is effected by bolts and the elements 170, which may be afforded by leaf springs, strips of synthetic plastics material or the like, extend downwardly from their bolted connections to the ring 168 towards the ground surface. The elements 170 are resilient to an extent dependent upon the particular material that is chosen for their formation and upon the cross-sectional shape of each element but the resilient should be such that forces exerted on the rake member 17 during operation are resiliently opposed in a dampening manner. The stiffening tape 169 that has already been described with reference to FIG. 24 of the drawings is secured by further bolts to lower end regions of all of the elements 170, said bolts also being employed to fasten some of the tine groups 36 in their appointed positions. The tape 169 functions as a resilient wall or wall portion and also serves as a felly for the tine groups 36. The construction and arrangement of the tape 169 and the tine groups 36 may be the same as in the embodiment of FIG. 24 but it will be noted, in particular, that the wall 34 that extends troughout the height of the rake member 17 is omitted in the embodiment of FIG. 25.

FIG. 26 illustrates a construction of the rake member 17 in which the wall 34 is provided and is similar in construction and arrangement to the wall 34 in the embosiment of FIG. 24. However, in the embodiment of FIG. 26, the wall 34 is further reinforced and stiffened by means of a plurality of flexible strips 171 that are fastened to the external surface of the wall 34 at regular intervals around the axis 19 in such a way that each strip 171 extends substantially longitudinally parallel to that axis. Strips 171 may additionally, or as an alternative, be secured to the internal surface of the wall 34, such securing being effected by bolts, rivets, staples, or other wire or by an adhesive. There are 32 of the strips 171 fastened to the wall 34 of the rake member 17 in the embodiment of FIG. 26 of the drawings, the tine groups 36 being fastened to the lower edge region on the wall 34 that is stiffened by the tape 169 at locations between the successive strips 171.

FIG. 27 of the drawings illustrates a construction of the rake member 17 in which the spoke-like supports 33 are of rigid tubular construction and in which radially outermost regions of those supports have helically coiled portions of spring steel rods 172 wound around them. Each helical coil has a straight end which is rigidly but releasably secured to the corresponding support 33 by clamping bracket 173. The opposite end of each helical coil merges into a substantially straight portion of the corresponding rod 172 that is approximately tangentially disposed with respect to a circle centred upon the axis of rotation 19 when the rake member 17 is viewed lengthwise of that axis 19. The substantially straight portion that has just been mentioned extends rearwardly away from the support 33 with respect to the intended direction of rotation K (FIG. 23) for a distance which is equal to substantially 20 % of the radius of the rake member 17. The end of each substantially straight portion that is remote from the corresponding helical coil is bent over outwardly and is entered through a slot in the wall 34 and in the stiffening tape 169 after which it extends along the external surface of the wall 34 over a further distance which is also equal to substantially 20 % of the radius of the rake member 17. Although not clearly evident from FIG. 27 of the drawings, it will be noted that the portion of the rod 172 that is located externally of the wall 34 is inclined at an angle of substantially 45° to a plane that is perpendicular to the axis 19. The free end of the rod 172 that is remote from the clamping bracket 173 is bent over through an angle of substantially 135° to terminate in a substantially horizontal portion that is secured to the wall 34 by a clamp 174. Each of the supports 33 of the rake member 17 may be provided with one of the spring structures that are afforded by the rods 172, but, as an alternative, only some of said supports 33 have corresponding rods 172, said rods 172 being arranged at regular intervals around the axis 19. Other parts of the rake member 17 of FIG. 27 of the drawings may be similar or identical to parts that have already been described above.

In the use of the machine illustrated in FIG. 23 of the drawings with any of the rake member embodiments that have been described with reference to FIGS. 24 to 27 thereof, the various parts that afforded the flexible walls of the rake members 16 and 17 are caused to assume a substantially right-circular cylindrical configuration by the centrifugal forces to which they are subject as the result of rotation of the rake members 16 and 17. If the supports 33 are of flexible construction, they will be brought to fairly stable configurations in which they extend substantially perpendicular to the axes 18 and 19 as a result of the centrifugal forces that act upon the supports themselves and upon the rings 168 and parts that afford the walls that are connected to those rings. A lowermost edge region of each flexible wall 34 or the tape 169 carried by the elements 170 moves closely over the ground surface in the direction J or K and also, simultaneously, forwardly in the direction of travel H. The axes of rotation 18 and 19 are vertically disposed or very nearly vertically disposed and the lower edge regions of the walls of the two rake members 16 and 17, however formed, tend to move the displaced hay or other crop rearwardly with respect to the direction H between the rake members 16 and 17. Once again, the flexible wall 34 or 169/170 is itself an effective crop-displacing member but its efficiency is greatly increased by the provision of the many groups 36 of the tines that are short as compared with the tines of conventional rotary rake members. When the wall 34 of the rake member 17 meets an undulation or obstacle in the embodiment of FIG. 24 of the drawings, it will be locally deformed at least partly in an upward direction with respect to the axis 19 and will, of course, need a short period of time to regain its correct undeflected position after the undulation or obstacles has been passed. In order that the braking action of the member 17 should not be significantly reduced during that short period of time, the stiffening tape 169 prevents the lower edge region of the wall 34 from being excessively deformed so that it will tend to remain constantly close to, or in contact with, the ground surface. Most of the deflection of the wall 34 that takes place as the result of contact with an undulation or obstacle occurs in the unstiffened region thereof that is located above the tape 169 and below the ring 168. The wall 34 can fold principally in directions parallel to the axis 19 but folding of the lower edge region thereof is greatly minimised by the tape 169. The tape 169 also prevents excessive wear of the lower edge region of the wall 34, particularly when it includes metal wear-resistant elements, and greatly enchances the stable fastening of the tine groups 36 in their appointed positions.

The strip-shaped elements 170, which are preferably leaf springs, are employed in the embodiment of FIG. 25 of the drawings in order to suppress or dampen the reaction of the rake member 17 to an encounter with a ground undulation or obstacle. The elements 170 cover the whole height of the rake member 17 in a direction parallel to the axis 19 and tend to maintain the lower edge of the wall 169/170 of the rake member reliably in constant contact with, or very close proximity to, the ground surface. The rigid connections of the upper ends of the elements 170 to the ring 168 stabilize deformations of the wall in radial, axial and tangential directions. The resilient strips 171 that are employed in the embodiment of FIG. 26 of the drawings improve the adaptation or matching of the lower edge of the wall 34 to undulations in the ground surface or obstacles that may be met with during operation by stiffening the wall 34 in directions that are substantially parallel to the axis 19 so that the lowermost edge of the wall 34 tends to remain reliably in contact with, or close proximity to, the ground surface. It will also be noted that, in the embodiment of FIG. 26, the strips 171 themselves constitute outward projections or extensions of the surface of the wall 34 and thus enhance the raking action of that wall.

In the embodiment of FIG. 27 of the drawings, the downwardly and rearwardly inclined portions of the spring steel rods 172 that lie against the external surface of the wall 34 dampen local deformations of the wall 34 when ground undulations, obstacles or heavy accumulations of hay or other crop are mit with. The oblique dispositions of the portions of the rods 172 that have just been mentioned enable them to deflect not only resiliently inwardly and outwardly towards the axis 19 like the elements 170 in the embodiment of FIg. 25 but also upwardly and downwardly in directions substantially parallel to the axis 19. A constant satisfactory raking action of the member 17 is thus promoted, the rods 172 tending to prevent the flexible wall from becoming "screwed up" as a result of high crop or ground resistance to rotational movement of its lower edge while a strong rotational driving torque continues to be applied to its upper edge. The effect of such screwing up of the rake member 34 is to raise the lower edge of its wall 34 away from the ground surface which can seriously interfere with the raking action of the member 17. It will be noted that the clamping brackets 173 can be moved axially inwards or outwards along the supports 33 to cause the rods 172 to exert an inwardly or outwardly biasing effect upon the wall 34 and it is alternatively, or additionally, possible to re-adjust the clamping bracket 173 to angularly displaced positions about the supports 33 thus causing the rods 172 to exert an upward or downward biasing effect upon the wall 34. Such adjustments can be made, as required, to match the crop that is being dealt with, the nature and condition of the ground surface/and other operating factors such as weather conditions. The rods 172 dampen or suppress the folding of the wall 34 and the fastening of the rods to the external surface of the wall 34 by the clamps 174 has been found to reduce the accumulation of dirt where the rods 152 bear against the wall 34.

FIGS. 28 and 29 of the drawings illustrate an embodiment in which a large number of the tine groups 36, such as thirty-two such groups, is provided around the circumference of the rake member 17 in a lower edge region of the wall 34 thereof. The tine groups 36 are fixed to the flexible material of the wall 34 itself and to cooperating stiffening tape 169. The tine groups 36 are, of course, spaced apart from one another at regular intervals around the wall 34 and each group comprises an upper tine 175 and a lower tine 176 which are located obliquely one above the other in such a way that the upper tine 175 of each group 36 is further advanced with respect to the intended direction of rotation K than is the lower tine 176 thereof. Bolts 177 secure the tine groups 36 to the wall 34 and the stiffening tape 169 and are entered substantially radially through aligned holes in those parts. Each bolt 177 is embraced, inwardly of the wall 34 and stiffening tape 169, by a curved portion 178 of the spring steel rod or other material of the corresponding integral pair of tines 175 and 176, said curved portion 178 subtending an angle of substantially 120° at the longitudinal axis of the bolt 177. The opposite ends of the curved portion 178 of each tine group 36 merge by way of upper and lower straight line portions 179 and 180 respectively into the corresponding upper and lower tines 175 and 176. The portions 179 and 180 are disposed in front of the curved portion 178 with respect to the direction K and the upper substantially horizontally disposed portion 179 is substantially tangential to a circle centred upon the axis 19. The tine material portion 179 merges into the tine 175 itself by way of a bend having an angular magnitude of substantially 115° so that, as will be evident from FIGS. 28 and 29 of the drawings, the tine 175 is swept back rearwardly from root to tip with respect to the direction K and is behind a radial plane containing the axis 19 and the root end of that tine with respect to said direction K. The substantially 115° bend which has just been mentioned is, of course, entered through registering holes in the wall 34 and the stiffening tape 169. The longitudinal axis of the tine portion 180 is inclined to that of the tine portion 129 by an angle of between substantially 25° and substantially 30° and extends downwardly and forwardly with respect to the direction K from the lower end of the curved portion 178. The leading end or the portion 180 merges by way of a curve having an angular magnitude of substantially 115° into the root end of the corresponding lower tine 176, said curve also being entered through corresponding aligned holes in the wall 34 and stiffening tape 169. The tine 176 is also rearwardly swept back from root to tip with respect to the direction K and is located behind a radial plane containing the axis 19 and the root end of the tine with respect to that direction. As viewed radially (FIG. 29), the two tines 175 and 176 are inclined downwardly and rearwardly with respect to the direction K from root to tip and are inclined at angles of between substantially 25° and substantially 30° to planes that are perpendicular to the axis 19. As seen in FIG. 29, the free end or tip of each lower tine 176 is located at a level a little below that of the lowermost edge of the wall 34 and co-operating stiffening tape 169.

The portions 178, 179 and 180 of each tine group 36 afford a tine holder for the corresponding tines 175 and 176 and each such tine holder is provided with a corresponding clamping plate 181 that lies between the tine holder and the stiffening tape 169. As seen in a radial direction (FIG. 29), the periphery of each clamping plate 181 completely surrounds the corresponding tine holder. The plates 181 are all identical and each of them has three holes that respectively receive the bolt 177 and the curved junctions between the tine 175 and the portion 179 and between the tine 176 and the portion 180. Each plate 101 is of a basically triangular shape although its three corners are rounded and the edge thereof that is foremost with respect to the direction K is formed with a rebate to keep the mass of the plate as small as possible. One flat side of each plate 181 bears against the stiffening tap 169 or against the wall 34 in the event that the stiffening tape 169 is provided at the radially external side of that wall. Each pair of tines 175 and 176 and the corresponding tine holder are made from a single length of spring steel rod or wire and the curved portion 178 of the tine holder and neighbouring ends of the substantially straight portions 179 and 180 are embraced by a shaped clamping member 182 formed from sheet material. The clamping member 182 bears against the sides of the portions which have just been mentioned that face the axis of rotation 19, the member having a substantially perpendicularly bent over rim that bears against the side of the curved portion 178 of the tine holder that is radially outermost with respect to the axis of the corresponding bolt 177. The rim which has just been mentioned subtends an angle of substantially 120° at the axis of the corresponding bolt 177, said rim being in abutting contact with the tine material throughout the curved portion 178 and the neighbouring ends of the portions 179 and 180. Each clamping member 182 can, in fact, be considered as being shell-shaped. Each bolt 177 has a shallow domed head 183 at the radially outer end thereof, the flat bearing surface of said head 183 being in engagement with the wall 34 or with the stiffening tape 169 in the event that said tape is located at the radially innermost external side of the wall 34. The radially innermost surface of each clamping member 182 bears against a spring circlip 184 that surrounds the shank of the corresponding bolt 177, said shank also being entered, in turn, through a slot in an arm 185, a washer 186 and a retaining nut 187 which is tightened to maintain the whole assembly in a substantially rigid condition.

Each arm 185 extends both forwardly and rearwardly from its bolt 177 with respect to the direction K but, as will be evident from FIGS. 28 and 29 of the drawings, the major portion of its length is normally directed rearwardly from the bolt 177 with respect to said direction. Each arm 185 has a very slight angular bend approximately midway along its length to compensate for the the convex curvature of the neighbouring wall 34 and tape 169 so that the arm 185 is in spaced relationship from those parts throughout its length. Measured along the circumference of the rake member 17, the length of each arm 185 is between substantially 60% and substantially 90% of the distance between two immediately neighbouring bolts 177, a value of substantially 75% of that distance being preferred. If the very slight bends in the arms 185 were to be made larger, the lengths of those arms in the direction which has just been mentioned would, of course, be correspondingly reduced. A mass or weight 188 is fastend to the radially inner side of each arm 185 at the rearmost end thereof with respect to the direction K. As will be seen in FIG. 29 of the drawings, the slot in each arm 185 extends throughout nearly the whole of the length of that arm that does not carry the corresponding weight 188. The weights 188 may be welded or otherwise fixedly secured to the arms 185 but, if preferred, they may be releasably attached thereto in such a way that weights of different magnitudes can be substituted for the weights 188.

In the use of the rake member 17 when constructed in accordance with the embodiment of FIGS. 28 and 29 of the drawings, the tine groups 36 and their integral tine holders are urged outwardly with respect to the axis of rotation 19 by the centrifugal forces that are generated when the rake member 17 is rapidly revolving. The resistance of hay or other crop to displacement by the tines 175 and 176 tends, however, to turn those tines rearwardly of the direction K in more or less tangential directions with the consequence that they tend to move inwardly towards the axis 19. Without the compensating factors that are provided, the flexible wall 34 might be brought by the forces that act thereon, and upon the tine groups 36, to a disadvantageous position in which the tines 175 and 176 are swept back too far rearwardly from root to tip with respect to the direction K. Such a position reduces the effective shedding of hay or other crop from the tines and greatly minimises their capacity for engaging and picking up further crop. The front of the wall 34 with respect to the direction H (FIGS. 23 and 24) tends to occupy a disadvantageous position for effective raking and there can even be a strong tendency for the forces to which the wall 34 is subject to tear or burst the flexible material thereof.

In order to avoid the disadvantageous effects that have been discussed in the preceding paragraph, the weights 188 that are rigidly coupled to the tine holders are disposed in such positions that they are located appreciable distances behind the corresponding tine holders with respect to the direction K. As a result, the centrifugal forces which act upon the weights 188 during operation oppose, and substantially counterbalance, the forces that act upon the tines 175 and 176 when crop, and even very heavy accumulations of crop, is being displaced. The tine groups 36 thus tend to remain in the positions that are most suitable for producing an optimum raking effect. With this construction, there is a tendency for the rake member 17 to assume the shape of a regular many-sided polygon during operation and when viewed lengthwise of the axis 19 and this is a shape which does not tend to tear or burst the flexible material of the wall 34 to any serious extent. It will be realised that the retaining nuts 187 can be temporarily loosened to allow the slotted arms 185 to be slid rearwardly or forwardly relative to the direction K to alter the positions of the weights 188 whereafter the nuts 187 are re-tightened. It will be evident that such adjustment will vary the compensating effect of the weights 188 which can thus be brought to the optimum for any particular set of operating conditions. The spring circlips 184 can be relied upon to ensure that the arms 185 remain correctly in their appointed positions when the nuts 187 have been sufficiently tightened. It should be noted that the provision of the rebate in the leading edge of each clamping plate 181 with respect to the direction K is important because any mass that is located in front of the corresponding bolt 177 with respect to the direction K has to be balanced by an increased magnitude of the corresponding weight 188. Conversely, the smaller the mass of each plate 181 in advance of the corresponding bolt 177, the less need be the mass of each weight 188. It is desirable to keep the total mass as small as possible to avoid centrifugal forces unduly deforming the wall 34.

The weights 188 not only serve to maintain the tines 175 and 176 in correct positions with respect to the direction K as discussed above but also allow compensations to be made for curvatures in the wall 34 that may take place in directions more or less parallel to the axis 19. Such curvatures generally have a disadvantageous effect upon the positions of the tine groups 36. For example, if a machine incorporating the rake member 17 is to deal with heavy crop, there may be a tendency for the leading region of the wall 34 with respect to the direction H to be caved inwardly to a significant extent, particularly towards its lowermost edge. Under some conditions, hay or other crop can then get beneath the lower edge of the wall 34 and may be carried along by that inwardly inclined lower edge for some distance. When these conditions are likely to occur, the weights 188 can be adjusted in position to compensate for those conditions by loosening the nuts 187 and turning the weights and the arms 185 which carry them downwardly towards the ground surface before re-tightening said nuts. Such a position is shown in broken lines in respect of one weight 188 in FIG. 29 of the drawings. When such positions of the weights 188 are adopted, the centrigual forces generated during rotation of the rake member will tend to incline the lower edge region of the wall 34 and its stiffening tape 169 outwardly thus opposing the tendency of heavy accumulations of crop to turn it inwardly. The lower edges of the clamping plates 181 serve as wear-resistant elements that reduce the rate of wear of the lower edge of the wall 34 and tape 169. The plates 181 can be shaped and/or arranged in such a way that the lower edges thereof project slightly beneath the edges of the wall 34 and tape 169. The slightly inward bends in the arms 185 towards the axis 19 enable those arms to be quite long without interfering with the flexibility of the wall 34 during operation since the arms 185 and weights 188 do not bend to contact the wall and cannot damage the same. The many-sided polygonal configuration of the wall 34 of the rake member 17 which results during operative rotation of the rake member when the arms 185 are correctly adjusted prevents sharp folds from occuring in the material of the wall so that the lifetime of that wall may be as long as possible.

FIG. 30 of the drawings illustrates a raking machine having a frame 190 in which a single rake member 191 is mounted so as to be rotatable about a substantially vertical axis 192 that is actually so disposed that an upper region thereof is further advanced with respect to the intended direction of operative travel P of the machine than is a lower region thereof. However, the axis 192 may be very nearly truly vertically disposed in accordance with the particular construction that is adopted for the rake member 191 and the nature of the hay or other crop that is to be dealt with. The frame 190 has a coupling member or trestle 193 of substantially inverted U-shaped configuration at its front with respect to the direction P, said coupling member or trestle 193 incorporating lower substantially horizontally aligned fastening means 194 and upper fastening means 195 neither of which require further description since they may be similar in construction and function to the previously described fastening means 4 and 5. Tubular beams 196 converge rearwardly with respect to the direction P from the top of the coupling member or trestle 193 as seen in the plan view of FIG. 30 and have their rearmost ends secured to the top of a gear box 197. As seen in FIG. 30 of the drawings, the coupling member or trestle 193 and the two beams 196 define a truncated substantially isosceles triangle whose base is foremost with respect to the direction P and substantially perpendicular to that direction. Rotary drive is transmittd to the rake member 191 from the gear box 197 which has a forwardly projecting rotary input 197A whose leading splined or otherwise keyed end is intended to be placed in driven connection with the power take-off shaft of an operating tractor or other vehicle to whose three-point lifting device or hitch the coupling member or trestle is connected in the use of the machine by way of an intermediate telescopic transmission shaft of known construction having universal joints at its opposite ends which shaft may be similar to the previously described known shaft 13. A tubular tie beam 198 has its leading end with respect to the direction P secured to the top of the coupling member or trestle 193 adjacent to the fastening means 195 and said beam extends downwardly and rearwardly with respect to the direction P to have its rearmost end also secured to the top of the gear box 197. It will be noted that, as seen in FIG. 30 of the drawings, the beam 198 coincides with a bisector of the apex angle of the previously mentioned truncated triangle that is afforded by the parts 193 and 196.

A beam 199 that extends substantially horizontally perpendicular to the direction P has a central region secured to the top of the gear box 197 and also to the rear ends of the tubular beams 196 and 198. The length of the beam 199 is slightly greater than the diameter of the rake member 191 and its opposite ends, that project laterally beyond the rake member 191, are bent over forwardly through substantially 90° to merge into tubular wing beams 200 that both extend forwardly from the beam 199 in substantially parallel relationship with the direction P. The leading ends of the two wing beams 200 are each bent over through less than 90° to form tubular supports 201 that converge forwardly with respect to the direction P and that have their leading ends fastened to lower regions of the coupling member or trestle 193 close to the fastening means 194. The parts 199, 200 and 201 can be formed integrally by suitably shaping a single tubular beam and it will be apparent from FIG. 30 of the drawings that, together, they afford protective brackets that lie above the rake member 191 and shield that rake member from contact with personnel, upright obstacles and so on.

The axis of rotation 192 is also the longitudinal axis of a stationary upright shaft whose lower end has a pair of horizontally aligned ground wheels 202 indirectly connected to it. The two ground wheels 202 are substantially symmetrical with respect to a vertical plane that extends in the direction P and that contains the axis 192. The mounting of the ground wheels 202 is, however, such that their points of contact with the ground surface are disposed in front of a vertical plane that is perpendicular to the direction P and that contains the point of intersection of the axis 192 with the ground surface. The ground wheels 202 are upwardly and downwardly adjustable relative to the frame 190 in a manner which may be known per se and which is not illustrated in the drawings but it is noted that this adjustability enables the inclination of the rake member 191 to the ground surface to be adjusted to, and maintained in, a desired setting.

In the embodiment of the rake member 191 which is illustrated in FIGS. 30 to 32 of the drawings, that rake member has the previously described flexible wall 34 (FIG. 32) which may be formed from any of the flexible materials previously discussed. The lowermost edge of the continuous wall 34 is close to, or in substantial contact with, the ground surface so that it is capable of displacing crop and of following ground undulations and avoiding obstacles by temporarily deflecting in axial and/or radial and/or tangential directions. Once again, any group lying at random on the field or in the form of a swath that is encountered by the rake member 191 during the use of the machine is displaced in the direction of travel P and, simultaneously, in the direction Q in which the wall 34 of the rake member 191 is rapidly rotating about the axis 192. The displacement that is effected by the flexible wall 34 is generally towards the left-hand side of the machine as viewed in FIG. 30 of the drawings where it is deposited on the ground in the form of a swath. In this embodiment, the wall 34 is folded in a controlled manner along at least part of its otherwise substantially right-circular cylindrical surface whereas it is stretched to some extent over all or part of the remainder of that surface. To that end, an upper edge region of the flexible wall 34 is connected to an unbroken circular supporting member 203 which itself is connected to a hub of the rake member 191 by four equiangularly spaced apart spokes 204. The radially inner ends of the spokes 204 are rigidly secured to the hub of the rake member 191 but it is emphasised that this hub is not rotatable about the axis 192 but is merely angularly adjustable about that axis to some extent in a manner which will be described below. Accordingly, the supporting member 203 and the spokes 204 will not rotate about the axis 192 during the operation of the machine. The supporting member 203 is of substantially annular configuration when viewed lengthwise of the axis 192 but actually consists of two neighbouring sections of L-shaped cross-section that together define an approximately U-shaped cross-section having upright limbs and a gap in its base. The gap which has just been mentioned extends through 360° around the axis 192 and serves to receive means for suspending the upper edge of the flexible wall 34. The distance between the upright limbs of the substantially U-shaped cross-section of the supporting member 203 is much less in one arc thereof that subtends very nearly 180° at the axis 192 than it is in the complementary arc thereof that subtends slightly more than 180° at said axis. In the broader arc of the member 203, the distance between the upright limbs of its cross-section is between substantially 12% and substantially 20% of the radius of the rake member 191 whereas, in the narrower arc, the distance between said upright limbs is between substantially 3% and substantially 5% of the radius of the rake member 191. The arc of the supporting member 203 that is of larger radial extent is located principally in front of the axis 192 with respect to the direction P although, as will be evident from FIG. 30 of the drawings, part thereof is located behind that axis to the right-hand side thereof. Only a small part of said arc is located to the left of the axis 192, with respect to the direction P, in a leading region of the rake member 191. It will be remembered that the supporting member 203 is formed by two sections of L-shaped cross-section with a gap between them, said sections extending concentrically around the axis 192. The arc of said member 203 that is of greater radial extent comprises inner and outer sections 205 and 206 while the arc of smaller radial comprises the same outer section 206 but a more closely adjacent inner section 207. One limb of each section extends substantially horizontally perpendicular to the axis 192 while the other limb thereof extends upwardly from the first-mentioned limb in substantially parallel relationship with said axis. The gap between the two substantially horizontal limbs of the two sections of each arcuate portion is open through 360° around the axis 192 but is, of course, of much greater radial extent in the broader arc of the member 203 than in the narrower arc thereof. As a consequence, the upper edges of the upright limbs of the sections 205, 206 and 207 are fastened to end regions of the spokes 204 that are remote from the aforementioned hub that is connected to the gear box 197. If desired, a cover may be provided over the whole of the top of the supporting member 203 to minimise or prevent the intrusion of soil and other contaminants.

A chain 208 comprising a large number of links 209 is received between the upright limbs of the supporting member 203, the ends of each link 209 being turnably connected to the neighbouring links by pivot pins 210 that are substantially parallel to the axis 192. A roller 211 is rotatably mounted on each pivot pin 210 between the corresponding pair of links 209. The rollers 211 bear by their lower ends against the lower limb of either the section 205 or the section 206 in the broader arc of the member 203 and against the lower limbs of both the sections 206 and 207 in the narrower arc of said member 203. The curved surfaces of the rollers 211 are guided by the upright limbs of the corresponding sections 205 and 206 in the broader arc of the member 203 and by the upright limbs of both sections 206 and 207 in the narrower arc thereof. The upper edge region of the flexible wall 34 is connected to the lower ends of the pivot pins 210 by supporting members that are not illustrated in the drawings but that may, for example, take the form of short steel rods having eyes at both ends. These members project downwardly through the gap between the sections 205/206 and 206/207 which gap, it will be remembered, extends through 360° around the axis 192.

A driving member that is generally indicated by the reference 212 is arranged centrally of the rear right-hand quadrant of the rake member 191 as viewed in plan (FIG. 30) and with respect to the direction P. The driving member 212 coincides with one of the two junctions between the broader and narrower arcs of the supporting member 203 and, accordingly, the inner sections 205 and 207 of those two arcuate portions are locally extended in a radially inward direction to form a support 213. The support 213 has two inwardly convergent upright limbs 214 and 215 whose lower edges are interconnected by a plate 216 that is integral therewith and that extends substantially perpendicular to the axis 192. The radially outer ends of the upright limbs 214 and 215 make junctions with the upright limbs of the sections 207 and 205 respectively. As previously mentioned, the limbs 214 and 215 converge inwardly but, well before said limbs meet, they are both bent outwardly from each other and thence both extend inwardly towards the hub located beneath the gear box 197 in parallel relationship. A driving wheel 217 is rotatably mounted between the outwardly divergent portions of the limbs 214 and 215 about the axis of a shaft 218 that is parallel to the axis of rotation 192. The driving wheel 217 has a number, such as six, of broad teeth 219 which are shaped to enter the gaps between the upper and lower plates of each link 209 (said links 209 being basically similar to the links of bicycle and like transmission chains), the rollers 211 fitting in the recesses between neighbouring broad teeth 219. When the driving wheel 217 is rotated in a manner which will be discussed below, the chain 208 is caused to move around the supporting member 203 in the direction Q that is indicated by arrows in FIGS. 30, 31 and 32 of the drawings.

An arcuately curved adjusting strip 220 (FIG. 30) has its leading end rigidly secured to the transverse beam 199 in such a position that its centre of curvature coincides with the axis 192. The strip 220 is formed with a row of holes 221 and the plate 216 which interconnects the driving member limbs 214 and 215 is formed with a single hole at the same distance from the axis 192 as is each of the holes 221. The whole assembly comprising the supporting member 203, the spokes 204, the driving member 212 and the parts which they carry (including the wall 34) can be turned angularly about the axis 192 and a substantially vertical locking pin 222 can be entered downwardly through a chosen one of the holes 221 and the single hole in the plate 216 to maintain the whole assembly that has just been mentioned in a corresponding angular setting about the axis 192. The principal effect of such an adjustment is to change the positions of the relatively broad and relatively narrow arcs of the supporting member 203 about the axis 192. The gear box 197 comprises an output sprocket wheel (not shown) that is rotatable about the axis 192 and that is in driven connection with the rotary input shaft 197A by way of transmission members contained within said gear box. A transmission chain 224 extends around the output sprocket wheel which has just been mentioned and also around a further sprocket wheel 223 that is rigidly connected to the driving wheel 217 so as to be rotatable about the axis of the shaft 218.

FIG. 32 of the drawing illustrates the arrangement of a large number of the tine groups 36 on the flexible wall 34, the tines of said groups being entered through holes in the material of the wall 34 and having their root ends secured to that material by bolts, rivets or like fastening members that are also entered through said material. When the tine groups 36 are in register with the arc of the supporting member 203 that is of relatively narrow radial extent, they are swept back rearwardly with respect to the direction Q so as to be inclined to tangential lines to the wall 34 at the fastening points thereof by angles of substantially 30° as seen lengthwise of the axis 192 (FIG. 32). The fastenings of the tine groups 36 are such that this inclination to the wall 34 is maintained under all likely operating conditions. It will also be seen from FIG. 32 that, when the wall 34 undergoes controlled folding in the arc of the member 203 that is of broader radial extent, as will be further discussed below, the tine groups 36 adopt substantially radial dispositions when the rake member 191 is viewed lengthwise of its axis of rotation 192.

In the use of the machine that has been described with reference to FIGS. 30 to 32 of the drawings, its coupling member or trestle 193 is connected to the three-point lifting device or hitch of an agricultural tractor or other operating vehicle by the fastening means 194 and 195 and the rotary input shaft 197A of the gear box 197 is placed in driven connection with the power take-off shaft of the same tractor or other vehicle by way of an intermediate telescopic transmission shaft as discussed above. Upon rotating the input shaft 197A, the drive that is imparted thereto is transmitted by the chain 224 and the sprocket wheel 223 to the driving wheel 217. This causes the chain 208 to move quite rapidly in the direction Q around the supporting member 203, said chain essentially adopting the zig-zag folded configuration that is illustrated in the drawings in the arc of said member 203 that is of greater radial extent because the straight length of said chain 208 is much greater than the circumferential length of the member 203 and said chain can only be accommodated in that member when it is folded in the manner just mentioned throughout the length of the broader arc of said member. In order to ensure positively that the rollers 211 do not become disengaged from the underlying horizontal limbs of the sections 205 and 206 where the gap between those limbs is of much greater width than the diameter of the rollers 211, the pivot pins 210 may be extended upwardly above the links 209 for cooperation with at least one guide strip that will be located between the upwardly extended ends of alternate pins 210 around the arc of the member 203 that is of greater radial extent. The or each such guide strip will be secured to the same supporting structure as carries the sections 205 and 206. Folding of part of the chain 209 naturally results in similar folding of the underlying flexible wall 34 since the upper edge of that wall is suspended from the lower ends of the pins 210. The zig-zag line shown in broken lines in FIG. 30 thus denotes the folded region of the chain 208 and also the underlying folded part of the wall 34, a small portion of the latter also being visible in FIG. 32 of the drawings. At a location substantially perpendicularly opposite to the driving wheel 217, there is a junction 225 between the arcs of the member 203 that are of relatively greater and relatively narrower radial extent. As will be seen from FIG. 30 of the drawings, the junction 225 is so shaped that the upright limbs forming part thereof present a substantially funnel configuration to the chain 208 so that the link 209 thereof smoothly regain the non-zig-zag configuration that exists throughout the arc of the member 203 that is of narrow radial extent. Due to the drive transmitted to the chain 208 by the wheel 217, the chain and underlying wall 34 are stretched to some extent in the arc of the member 203 that is of narrow radial extent, said chain being effectively pulled through that arc by the wheel 217 whereas it is effectively pushed into the arc of broader radial extent by the same wheel 217 and is automatically brought to the folded zig-zag configuration that has described and that is illustrated in the drawings. Clearly, it is an upper region of the flexible wall 34 that is of most pronouncedly zig-zag configuration in the arc of that wall that undergoes controlled folding since the flexibility of the wall will soften the folding to some extent in lower regions thereof. It is noted that it is possible, if required, to duplicate the sections 205, 206 and 207, the chain 208 and, if required, the driving wheel 217 at a lower level in the rake member 191 which level may, advantageously, be towards the lowermost edge of the wall 34. With this duplicated construction, the wall 34 will remain in a controlled folded condition substantially from top to bottom throughout the arc of the member 203 that is of broad radial extent. There are inward cavities between the outwardly directed folds of the wall 34 and these cavities receive and temporarily hold displaced crop during movement of the rake member 191 in the directions P and Q. Such crop moves around the axis 192 with the folded wall 34 in the direction Q until, in the region of the junction 225, the outer surface of the wall 34 regains its smooth substantially cylindrically curved configuration. The retained crop is then released from the unfolded cavities and can be ejected from the rake member without difficulty.

The folds in the wall 34 are very effective in enabling it to retain hay or other crop in contact therewith but the tine groups 36 that have been described with reference to FIG. 32 of the drawings may optionally also be provided if this is considered to be necessary for dealing with some kinds of crop. The tine groups 36 are located in a lower region of the wall 34 and, as previously described, move automatically from substantially radial positions (as viewed lengthwise of the axis 192) to steeply swept back or trailing positions (with respect to the direction Q) from root to tip in the area of the junction 225. A raking machine is thus provided whose rake member has a flexible wall which, in an appropriate arcuate region thereof, has a large number of extensions or projections (folds and/or tine groups 36) which are most effective in engaging and carrying along hay or other crop whereas, in a further appropriate arcuate region, the extensions or projections are automatically eliminated or are moved to dispositions that greatly facilitate crop shedding. It will be remembered that the angular positions of the complementary arcs of the member 203 that have relatively broad and relatively narrow radial extents can be adjusted about the axis 192 with the air of the adjusting strip 220 and locking pin 222 to enable optimum settings to be adopted for dealing with crops of different kinds and densities in varying operating conditions.

What we claim is:

1. A raking machine comprising a frame movable over the ground and at least one rake head supported on said frame and rotatable about an upwardly extending axis, said rake head comprising a substantially central portion and outer flexible wall means which, at least during rotation, is deflectable and extends around said axis of rotation, support means interconnecting said flexible wall means with the central portion and raking means on said wall means, said raking means being located adjacent the outer perimeter of said wall means, driving means connected to rotate said rake head and said wall means being acted upon by centrifugal forces generated during rotation thereof to normally assume an outer generally circular configuration when viewed in plan.

2. A machine as claimed in claim 1, wherein said wall means is endless and encircles said axis of rotation.

3. A raking machine comprising a frame movable over the ground and at least one rake head supported on said frame and rotatable about an upwardly extending axis, said rake head comprising a substantially central portion and an outer flexible wall, said wall being comprised, at least in part by a deflectable sheet that extends around said axis of rotation, support means interconnecting said wall with the central portion and said sheet, said raking means being located adjacent the outer perimeter of said wall, driving means connected to rotate said rake head and said wall being acted upon by centrifugal forces generated during rotation thereof to normally assume an outer generally circular configuration when viewed in plan.

4. A mcahine as claimed in claim 3, wherein said flexible wall is deflectable in a direction substantially parallel to the axis of rotation.

5. A machine as claimed in claim 3, wherein said flexible wall is deflectable in a substantially radial direction with respect to the axis of rotation.

6. A machine as claimed in claim 3, wherein said flexible wall is deflectable in a substantially tangential direction with respect to a circle centered upon the axis of rotation.

7. A machine as claimed in claim 3, wherein said wall is rubber or synthetic plastic.

8. A machine as claimed in claim 3, wherein said sheet is canvas.

9. A machine as claimed in claim 3, wherein said wall comprises at least two different materials.

10. A machine as claimed in claim 3, wherein said wall defines a right circular cylinder, at least during operation of the machine.

11. A machine as claimed in claim 10, wherein the longitudinal axis of said cylinder substantially coincides with the axis of rotation of said rake head.

12. A machine as claimed in claim 3, wherein the lowermost edge of said wall is located closely adjacent the ground surface during operation.

13. A machine as claimed in claim 3, wherein the axis of rotation of said rake head is inclined to the vertical during operation and an upper portion of said axis is further advanced with respect to the normal direction of travel of said machine than a lower portion thereof.

14. A machine as claimed in claim 3, wherein said wall extends for a height of substantially 40 centimeters.

15. A machine as claimed in claim 3, wherein said wall is supported on a central shaft of said central portion and maintained in a taut condition during operation by the centrifugal forces that are generated by rotation of the rake head.

16. A raking machine comprising a frame movable over the ground and at least one rake head supported on said frame and rotatable about an upwardly extending axis, said rake head comprising a substantially central hub and an outer flexible sheet which, at least during rotation, is a generally circular, deflectable wall that substantially encircles said axis of rotation, support means interconnecting said flexible sheet with the central hub and crop gathering means mounted on said sheet adjacent the bottom and outer perimeter of said wall, driving means connected to rotate said rake head and said gathering means extending outwardly from said outer perimeter during operational rotation.

17. A machine as claimed in claim 16, wherein said crop gathering means comprising spring steel tines secured to said wall.

18. A machine as claimed in claim 16, wherein said crop gathering means is sheet-shaped.

19. A machine as claimed in claim 18, wherein said crop gathering means includes strip-shaped fillets of substantially L-shaped cross-section that extend substantially parallel to the axis of rotation of the rake head.

20. A machine as claimed in claim 18, wherein said sheet-shaped members have serrated edges.

21. A machine as claimed in claim 16, wherein said crop gathering means comprises a plurality of tines on the outer side of said wall.

22. A machine as claimed in claim 21, wherein supports for the tines are located on the inner side of said wall.

23. A machine as claimed in claim 22, wherein said supports comprise portions of said tines.

24. A machine as claimed in claim 23, wherein said supports extend in a plurality of directions over the surface of said wall and are positioned in abutting engagement with that surface.

25. A machine as claimed in claim 22, wherein a support of each tine is positioned in front of that tine with respect to the normal direction of rotation of the rake head.

26. A machine as claimed in claim 21, wherein said tines are arranged in groups.

27. A raking machine comprising a frame movable over the ground and at least one rake head supported on said frame and rotatable about an upwardly extending axis, said rake head comprising a substantially central portion of an outer flexible sheet which, at least during rotation, is a generally circular deflectable wall that extends around said axis of rotation, support means interconnecting said flexible sheet with the central portion and tine means on said sheet, said tine means being located adjacent the outer perimeter of said sheet, driving means connected to rotate said rake head and said sheet being positioned between said tine means and said central portion.

28. A machine as claimed in claim 27, wherein said tine means includes a plurality of tines that are turnable freely about pivotal axes supported by said wall.

29. A machine as claimed in claim 28, wherein said pivotal axis are located inside said wall and are perpendicular to the axis of rotation.

30. A machine as claimed in claim 27, wherein said tine means is secured to said wall in an upper portion thereof.

31. A machine as claimed in claim 27, wherein said tine means is mounted on pivots on said wall and turnable about pivotal axes against resilient opposition.

32. A machine as claimed in claim 31, wherein the axes of said pivots extend substantially tangentially with respect to a circle centered upon the axis of rotation of the rake head.

33. A machine as claimed in claim 27, wherein the lower extremities of tines of said tine means are located adjacent the lowermost edte of said wall during rotation of said rake head.

34. A machine as claimed in claim 33, wherein the tines of said tine means project outwardly through openings in said wall.

35. A machine as claimed in claim 33, wherein said tines are fastened at least partly within said wall when said rake head is viewed lengthwise of its axis of rotation.

36. a machine as claimed in claim 33, wherein said tines are adjustable relative to said wall and securable in chosen positions of adjustment relative to that wall.

37. A machine as claimed in claim 36, wherein adjusting and securing means for said tines are fastened inside said wall.

38. A machine as claimed in claim 33, wherein said tines are turnable about upright pivotal axes.

39. A machine as claimed in claim 33, wherein said support means include tension springs.

40. A machine as claimed in claim 39, wherein said tension springs are positioned to move said wall inwardly towards the axis of rotation upon a decrease in the speed of rotation of said rake head.

41. A machine as claimed in claim 40, wherein said tension springs are connected to move the material of said wall in an upward direction upon a decrease in the speed of rotation of said rake head.

42. A raking machine comprising a frame movable over the ground and two rake heads supported on said frame and rotatable about corresponding upwardly extending axes, each of said rake heads comprising a substantially central portion and an outer flexible wall, said wall being comprised, at least in part by a deflectable sheet that extends around said axis of rotation, support means interconnecting said wall with the central portion and raking means on said sheet, said raking means being located adjacent the outer perimeter of said wall, driving means connected to rotate said rake head and said wall being acted upon by centrifugal forces generated during rotation thereof to normally assume an outer generally circular configuration when viewed in plan.

43. A machine as claimed in claim 42, wherein said driving means is connected to revolve said rake heads in the same direction.

44. A machine as claimed in claim 42, wherein said two rake heads are geared to said driving means to revolve in opposite directions.

45. A machine as claimed in claim 42, wherein height of the respective wall of each rake head is greater than the minimum distance between said rake heads.

46. A machine as claimed in claim 42, wherein each rake head is supported on a central shaft and at least one ground wheel is connected at the lower end of said shaft, sid wheel being vertically adjustable relative to said rake head and having retaining means retaining same at any chosen height adjustment.

47. A machine as claimed in claim 42, wherein said wall is of frusto conical configuration having an imaginary apex located above said machine.

* * * * *